(12) United States Patent
Wada et al.

(10) Patent No.: US 7,412,655 B2
(45) Date of Patent: Aug. 12, 2008

(54) METHOD AND SYSTEM OF PROVIDING DYNAMIC DIALOGS

(75) Inventors: Alan Wada, Mountain View, CA (US); Eric Burke, Northville, MI (US)

(73) Assignee: Yahoo! Inc., Sunnyvale, CA (US)

( * ) Notice: Subject to any disclaimer, the term of this patent is extended or adjusted under 35 U.S.C. 154(b) by 497 days.

(21) Appl. No.: 10/979,587

(22) Filed: Nov. 2, 2004

(65) Prior Publication Data

US 2006/0095860 A1 May 4, 2006

(51) Int. Cl.
G06F 3/00 (2006.01)
G06F 3/14 (2006.01)
G06F 15/16 (2006.01)

(52) U.S. Cl. .............. 715/744; 715/749; 715/760; 715/779; 715/809; 717/178

(58) Field of Classification Search ......... 715/716–719, 715/733, 738, 744, 749, 760, 764, 765, 771, 715/781, 809, 810, 826, 835, 970, 500.1, 715/501.1, 513, 203, 205, 234; 345/581, 345/589, 592, 629
See application file for complete search history.

(56) References Cited

U.S. PATENT DOCUMENTS

| | | | |
|---|---|---|---|
| 5,499,335 A | 3/1996 | Silver et al. | |
| 5,579,469 A * | 11/1996 | Pike ........................... | 715/781 |
| 5,630,042 A | 5/1997 | McIntosh et al. | |
| 5,675,752 A * | 10/1997 | Scott et al. .................. | 715/866 |
| 5,744,787 A | 4/1998 | Teicher | |
| 5,781,724 A | 7/1998 | Nevarez et al. | |
| 5,784,058 A | 7/1998 | LaStrange et al. | |
| 5,796,393 A | 8/1998 | MacNaughton et al. | |
| 5,802,530 A | 9/1998 | Van Hoff | |
| 5,805,803 A | 9/1998 | Birrell et al. | |
| 5,813,007 A | 9/1998 | Nielsen | |
| 5,848,424 A | 12/1998 | Scheinkman et al. | |
| 5,875,296 A | 2/1999 | Shi et al. | |
| 5,877,759 A | 3/1999 | Bauer | |
| 5,883,810 A | 3/1999 | Franklin et al. | |

(Continued)

FOREIGN PATENT DOCUMENTS

WO   WO 00/25239   5/2000

(Continued)

OTHER PUBLICATIONS

Tiziano Mengotti, "Message loop", http://gpu.sourceforge.net/gpu_p2p/node40.html.*

(Continued)

Primary Examiner—X. L Bautista
(74) Attorney, Agent, or Firm—Greenberg Traurig, LLP; James J. DeCarlo

(57) ABSTRACT

Methods and systems for providing dynamic dialogs, used with a downloadable toolbar for an Internet browser. In an embodiment of the invention an add-on browser toolbar, which may be implemented as a downloadable toolbar application that adds functionality to a Web browser, receives downloadable toolbar data that comprises dialog display data. In response to an event that calls for the display of a dialog, a dialog object is created and the dialog display data is loaded in the dialog object and then displayed to the user.

44 Claims, 14 Drawing Sheets

U.S. PATENT DOCUMENTS

| | | | |
|---|---|---|---|
| 5,890,172 A | 3/1999 | Borman et al. | |
| 5,914,714 A | 6/1999 | Brown | |
| 5,917,491 A * | 6/1999 | Bauersfeld | 715/810 |
| 5,933,142 A | 8/1999 | LaStrange et al. | |
| 5,949,419 A | 9/1999 | Domine et al. | |
| 5,963,952 A | 10/1999 | Smith | |
| 5,964,836 A | 10/1999 | Rowe | |
| 5,974,446 A | 10/1999 | Sonnenreich et al. | |
| 5,999,179 A | 12/1999 | Kekic et al. | |
| 5,999,972 A | 12/1999 | Gish | |
| 5,999,973 A | 12/1999 | Glitho et al. | |
| 6,000,832 A | 12/1999 | Franklin et al. | |
| 6,006,034 A | 12/1999 | Heath et al. | |
| 6,009,459 A | 12/1999 | Belfiore et al. | |
| 6,020,884 A | 2/2000 | MacNaughton et al. | |
| 6,025,836 A | 2/2000 | McBride | |
| 6,026,435 A | 2/2000 | Enomoto et al. | |
| 6,034,683 A | 3/2000 | Mansour et al. | |
| 6,041,360 A | 3/2000 | Himmel et al. | |
| 6,057,836 A | 5/2000 | Kavalam et al. | |
| 6,061,695 A * | 5/2000 | Slivka et al. | 715/513 |
| 6,072,486 A | 6/2000 | Sheldon et al. | |
| 6,101,486 A | 8/2000 | Roberts et al. | |
| 6,112,240 A | 8/2000 | Pogue et al. | |
| 6,119,098 A | 9/2000 | Guyot et al. | |
| 6,125,352 A | 9/2000 | Franklin et al. | |
| 6,141,010 A | 10/2000 | Hoyle | |
| 6,175,869 B1 | 1/2001 | Ahuja et al. | |
| 6,185,600 B1 | 2/2001 | Spence et al. | |
| 6,188,995 B1 | 2/2001 | Garst et al. | |
| 6,208,995 B1 | 3/2001 | Himmel et al. | |
| 6,216,153 B1 | 4/2001 | Vortriede | |
| 6,226,655 B1 | 5/2001 | Borman et al. | |
| 6,226,752 B1 | 5/2001 | Gupta et al. | |
| 6,232,972 B1 | 5/2001 | Arcuri et al. | |
| 6,256,668 B1 | 7/2001 | Slivka et al. | |
| 6,262,731 B1 | 7/2001 | Hasegawa | |
| 6,266,058 B1 | 7/2001 | Meyer | |
| 6,282,548 B1 | 8/2001 | Burner et al. | |
| 6,286,001 B1 | 9/2001 | Walker et al. | |
| 6,292,185 B1 | 9/2001 | Ko et al. | |
| 6,314,451 B1 | 11/2001 | Landsman | |
| 6,360,255 B1 | 3/2002 | McCormack et al. | |
| 6,373,507 B1 | 4/2002 | Camara et al. | |
| 6,385,619 B1 | 5/2002 | Eichstaedt et al. | |
| 6,407,754 B1 | 6/2002 | Hetherington et al. | |
| 6,433,800 B1 | 8/2002 | Holtz | |
| 6,434,563 B1 | 8/2002 | Pasquali et al. | |
| 6,460,058 B2 | 10/2002 | Kopulu et al. | |
| 6,469,713 B2 | 10/2002 | Hetherington et al. | |
| 6,476,833 B1 | 11/2002 | Moshfeghi | |
| 6,483,525 B1 | 11/2002 | Tange | |
| 6,486,892 B1 | 11/2002 | Stern | |
| 6,490,602 B1 | 12/2002 | Kraemer | |
| 6,493,000 B1 | 12/2002 | Wynn et al. | |
| 6,496,203 B1 * | 12/2002 | Beaumont et al. | 715/762 |
| 6,496,936 B1 | 12/2002 | French et al. | |
| 6,505,238 B1 | 1/2003 | Tran | |
| 6,542,897 B2 | 4/2003 | Lee | |
| 6,549,217 B1 | 4/2003 | De Greef et al. | |
| 6,584,505 B1 | 6/2003 | Howard et al. | |
| 6,624,831 B1 | 9/2003 | Shahine et al. | |
| 6,651,217 B1 | 11/2003 | Kennedy et al. | |
| 6,686,938 B1 | 2/2004 | Jobs et al. | |
| 6,704,031 B1 | 3/2004 | Kimball et al. | |
| 6,748,367 B1 | 6/2004 | Lee | |
| 6,789,201 B2 | 9/2004 | Barton et al. | |
| 6,819,343 B1 | 11/2004 | Sobeski et al. | |
| 6,851,060 B1 | 2/2005 | Shrader | |
| 6,865,680 B1 | 3/2005 | Wu et al. | |
| 6,868,331 B2 * | 3/2005 | Hanebrink | 701/117 |
| 6,868,394 B1 | 3/2005 | Mele | |
| 6,873,974 B1 | 3/2005 | Schutzer | |
| 7,039,872 B1 * | 5/2006 | Raheman | 715/748 |
| 7,111,246 B2 * | 9/2006 | Sauve et al. | 715/809 |
| 7,136,896 B1 * | 11/2006 | Srinivas et al. | 709/203 |
| 2001/0001147 A1 | 5/2001 | Hutchinson et al. | |
| 2001/0010663 A1 * | 8/2001 | Nakazawa et al. | 369/2 |
| 2001/0035885 A1 | 11/2001 | Iron et al. | |
| 2002/0018078 A1 | 2/2002 | Khan et al. | |
| 2002/0057299 A1 | 5/2002 | Oren et al. | |
| 2002/0062342 A1 | 5/2002 | Sidles | |
| 2002/0070963 A1 | 6/2002 | Odero et al. | |
| 2002/0070969 A1 | 6/2002 | Barksdale et al. | |
| 2002/0075326 A1 | 6/2002 | Allen | |
| 2002/0077978 A1 | 6/2002 | O'Leary et al. | |
| 2002/0078095 A1 | 6/2002 | Culham | |
| 2002/0089549 A1 | 7/2002 | Munro et al. | |
| 2002/0097277 A1 | 7/2002 | Pitroda | |
| 2002/0149615 A1 | 10/2002 | Rajarajan et al. | |
| 2002/0149618 A1 | 10/2002 | Estrada et al. | |
| 2002/0154159 A1 | 10/2002 | Day et al. | |
| 2002/0158912 A1 | 10/2002 | O'Rouke | |
| 2002/0163544 A1 | 11/2002 | Baker et al. | |
| 2002/0163545 A1 | 11/2002 | Hii | |
| 2002/0186239 A1 | 12/2002 | Komuro | |
| 2002/0186249 A1 | 12/2002 | Lu et al. | |
| 2002/0186255 A1 | 12/2002 | Shafron et al. | |
| 2002/0186256 A1 | 12/2002 | Hong | |
| 2003/0009768 A1 | 1/2003 | Moir | |
| 2003/0011641 A1 | 1/2003 | Totman et al. | |
| 2003/0028764 A1 | 2/2003 | Campbell | |
| 2003/0061052 A1 * | 3/2003 | Breuer | 704/266 |
| 2003/0067481 A1 | 4/2003 | Chedgey et al. | |
| 2003/0080995 A1 | 5/2003 | Tenenbaum et al. | |
| 2003/0085916 A1 | 5/2003 | Thiry et al. | |
| 2003/0085927 A1 | 5/2003 | Muller | |
| 2003/0112271 A1 | 6/2003 | Batalden et al. | |
| 2003/0112280 A1 | 6/2003 | Driskell | |
| 2003/0120600 A1 | 6/2003 | Gurevich | |
| 2003/0128233 A1 | 7/2003 | Kasriel | |
| 2003/0131106 A1 | 7/2003 | Kasriel | |
| 2003/0174154 A1 | 9/2003 | Yukie et al. | |
| 2003/0202009 A1 | 10/2003 | Kasriel | |
| 2003/0221167 A1 * | 11/2003 | Goldstein et al. | 715/513 |
| 2004/0061720 A1 | 4/2004 | Weber | |
| 2004/0125130 A1 * | 7/2004 | Flamini et al. | 345/738 |
| 2004/0174396 A1 | 9/2004 | Jobs et al. | |
| 2004/0186775 A1 | 9/2004 | Margiloff et al. | |
| 2004/0243520 A1 | 12/2004 | Bishop et al. | |
| 2005/0039141 A1 | 2/2005 | Burke et al. | |
| 2005/0039144 A1 | 2/2005 | Wada et al. | |
| 2005/0097574 A1 * | 5/2005 | Morrison et al. | 719/328 |
| 2005/0198220 A1 | 9/2005 | Wada et al. | |
| 2005/0227216 A1 * | 10/2005 | Gupta | 434/322 |
| 2005/0251753 A1 * | 11/2005 | Sawyer | 715/765 |
| 2006/0085439 A1 * | 4/2006 | Sawyer | 707/100 |
| 2007/0067297 A1 * | 3/2007 | Kublickis | 707/9 |
| 2007/0204308 A1 * | 8/2007 | Nicholas et al. | 725/86 |

FOREIGN PATENT DOCUMENTS

| | | |
|---|---|---|
| WO | WO 00/31657 A2 | 6/2000 |
| WO | WO 01/39046 A1 | 5/2001 |
| WO | WO 01/67285 A2 | 9/2001 |
| WO | WO 01/95104 | 12/2001 |
| WO | WO 03/038554 | 5/2003 |
| WO | WO 03/038640 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

Alexa Internet Website. Archived Feb. 9, 1998 at http://web.archive.org.

Eric Ladd and Jim O'Donnell, Using Microsoft Internet Explorer 4 Que Corporation. 1997 pp. 42-43.

Trupin, "The Visual Programmer puts Active X Document Objects Through Their Paces", Microsoft Systems Journal, Jun. 1996, v11, n6, p. 55(16).

"Client/Server and Host Application Development Tools", DBMS, Jun. 15, 1996, v9, n6, p. 27(10).

Childers, "Delphi Client/Server Suite", Sep. 10, 1996, PC Magazine, vol. 15, N1, p. 207 (3).

Persky, "HTML goes WYS/WYG: Two Mac-based Editors", Mar. 1997, LAN Magazine, v12, n3, p. 121(5).

Evans, "Extend Client/Server Apps to the Web", Mar. 1997, Databased Advisor, v15, n3, p. 52 (5).

Finn, "Add Control to your Intranet", Aug. 1997, Databased Web Advisor, v15, n8, p. 56(3).

Wong, "Meeting on the Internet in 10 Minutes", Nov. 1997, Network, v12, n12, p. 131(4).

Faison, "The New HTML Help System Extends Online Help From the Desktop to the Web", Jan. 1998, Microsoft Systems Journal, v13, n1, p. 55 (14).

Alwang "Meeting of the Minds", Feb. 24, 1998, PC Magazine, v17, n4, p. 179(10).

Walter, "Acrobat 4: Adobe's Bid to Make it More that Just a Viewer", Mar. 1999, Seybold Report on Internet Publishing, 3, 7, NA(1).

Alex Lash, "Alexa Accessorizes Browsers", Sep. 22, 1997, CNET News.com. 2 pages.

"As Go Surfers, So Goes Alexa". Jul. 24, 1997, Wired News, 2 pages.

Bart Eisenberg, "Alexa Archives the Internet", Copyright 1997, 5 pages.

Jesse Berst, "A Must-See Browser Add-On".Sep. 16, 1998, ZDNet AncorDesk, 3 pages.

International Search Report for International Application No. PCT/US99/25332, Feb. 2, 2000.

International Search Report for International Application No. PCT/US02/34509, Oct. 28, 2003.

International Search Report for International Application No. PCT/US02/34510, Jan 31, 2003.

Written Opinion for International Application No. PCT/US02/34510, Sep. 26, 2003.

International Search Report for International Application No. PCT/US01/16993, Oct. 25, 2001.

International Preliminary Examination Report for International Application No. PCT/US01/16993, Mar. 5, 2003.

International Preliminary Examination Report for International Application No. PCT/US99/25332, Jul. 29, 2002.

Mace, Thomas, "PowerBrowser", Mar. 12, 1996, PC Magazine, vol. 15, No. 5, p. 132(1).

Mendelson, Edward, "Wake Up Your Web Site", Jun. 9, 1998, PC Magazine, vol. 17, No. 11 p. 60(2).

"Band Objects", Microsoft Corporation, Copyright 1997, pp. 1-6.

"Browser Extensions", MSDN, Copyright 2004, pp. 1-2.

Creating Custom Explorer Bars, Tool Bands, and Desk Bands, MSDN, Copyright 2004, pp. 1-11.

"Developers Get Early IE 5", Jun. 11, 1998, Wired News, pp. 1-2.

"Introduction",XUL Programmer's Reference Manual, Last Updated: Apr. 5, 2001, pp. 1-3.

"Netscape 6 Preview Release 1", NT Compatible, Apr. 5, 2000, pp. 1-3.

"Plug-in-Guide", DevEdge Oline Documentation, Chapter 1, pp. 1-4 and 1-15, date unknown.

"Subject: Add toolbar to IE4-taskbar", Google Groups, Jan. 26, 1999, p. 1.

"Subject: Adding Toolbar (Plugin) in Netscape Communicator", Google Groups, May 18, 2000, pp. 1-4.

"Subject: Custom Toolbar for Netscape Browser", Google Groups, May 15, 2001, p. 1.

"Subject: How the Hell????", Google Groups, Jun. 6, 2000, pp. 1-3.

"Subject: How to add toolbar like Yahoo companion in IE", Google Groups, Sep. 30, 1999, Messages 1-10.

"Subject: How to add toolbar like Yahoo companion in IE", Google Groups, Sep. 30, 1999, Messages 11-14.

"Subject: IE4 Band Objects", Google Groups, Mar. 22, 1998, pp. 1-3.

"Subject: Plugins for IE", Google Groups, Sep. 30, 2000, p. 1.

"Subject: Toolbar like IE4", Google Groups, Apr. 23, 1998, pp. 1-2.

"Subject: What's the deal with Yahoo Companion? Standard plugin API or not?", Google Groups, Jan. 12, 2000, pp. 1-6.

Flanagan David, "Netscape 6.0 Released", O'Reilly, Nov. 16, 2000, pp. 1-3.

Galli Marcio, "The DevEdge RSS-News Ticker Toolbar", Netscape DevEdge, Jul. 14, 2003, pp. 1-3.

Jimmy, "Netscape 6.0 Preview Release 2 Review-Good Software, Bad Timing", Jimmy's World, Aug. 9, 2000, 3 pages.

Mann Alex and Hecht Kevin, "DevEdge Newsgroup FAQ: Client Technical" DevEdge Online Archive, Last Updated: Dec. 15, 1998, pp. 1-12.

Roberts Scott, "Programming Microsoft Internet Explorer 5", Jul. 1999, pp. 3-16,383-423, 461-475, Microsoft Press, USA.

Summers Jason, "Plug-ins Newsgroup FAQ: Plug-ins", DevEdge Online Archive, Last Updated: May 26, 1999, pp. 1-16.

Alexa, Alexa Toolbar Version 1.4.1, Copyright 1998[Note: Setup File Available on Enclosed CD Entitled "Alexa Setup".

International Preliminary Examination Report for International Application No. PCT/US02/34509, May 11, 2004.

International Preliminary Examination Report for International Application No. PCT/US02/34510, Aug. 12, 2004.

International Search Report for International Application No. PCT/US04/24397, Oct. 31, 2005.

Written Opinion for International Application No. PCT/US04/24397, Oct. 31, 2005.

International Preliminary Report on Patentability for International Application No. PCT/US2004/24397, Feb. 13, 2006.

Hauser, "Generic Extensions of WWW Browsers", First USENIX Workshop on Electronic Commerce, p. 147-154, Aug. 10, 1995.

\* cited by examiner

METHOD AND SYSTEM OF PROVIDING DYNAMIC DIALOGS

BACKGROUND OF THE INVENTION

1. Field of the Invention

The present invention is directed to computer interfaces and, more particularly, to a method and system of providing dynamic dialogs for use with a downloadable toolbar.

2. Description of Related Art

When accessing the Internet and the World Wide Web, an Internet user typically executes, via a computer, a browser software program such as, for example, Netscape Navigator™ or Microsoft Internet Explorer™. The browser establishes a link to the Internet (via a modem and an Internet Service Provider (ISP), for example) and also provides a textual and graphical user interface which includes a window for displaying Internet content and toolbars for interfacing with the browser.

In order to add functionality to Web browsers, Internet content providers can offer add-ons such as toolbars, via predetermined Internet sites, which can be downloaded or otherwise obtained by an Internet user and integrated into their Web browser interface. Examples of additional functionality that can be added by a downloadable or add-on toolbar include a search function, bookmarks, a pop-up blocker, etc.

Software applications, such as the downloadable toolbar, use temporary windows called dialogs to give information to and obtain information from the user. For example when the user selects functions such as "open", "save", "print", "preferences" and "about", the application creates a dialog to interface with the user. For example, selecting "about" from the menu bar of an application opens a dialog including the name and version number of the application.

Dialogs can be modal or modeless. A modal dialog does not allow the user to continue to use the application until the dialog is dismissed, while a modeless dialog does not have to be dismissed for a user to continue to utilize the application.

A deficiency with present dialogs, however, is that the information that is displayed in a dialog is limited to the dialog display data that is included in the application data that is initially installed on a user's computer. Therefore, if a software provider wants to support multiple languages, a copy of each dialog in every supported language would have to be included in the initial application data. In addition, the content provider cannot modify the look of a dialog or add options to a dialog without having the user reinstall or upgrade the application. Since it is not preferable to have large installation files that have multiple languages, or to require users to perform frequent reinstallations, a need exists for an improved method and system for providing dynamic dialogs that give the content provider more control over the display and use of dialogs.

SUMMARY OF THE INVENTION

The invention satisfies these and other needs, which will be apparent from the teachings herein. An embodiment of the invention comprises an Internet content provider offering a downloadable toolbar application that adds functionality to a Web browser, and providing downloadable toolbar data that defines the buttons of the toolbar. The toolbar data can also comprise parameter data that includes, for example, dialog display data for additional toolbar features, such as dynamic dialogs. The dialog display data may be raw HTML that is cached by the user's computer for later use.

In an exemplary embodiment, the toolbar application is downloaded and installed in a first download, while the toolbar data, which comprises dialog display data, is received in a subsequent download, for example, in a data feed from the Internet content provider. The toolbar application may, upon the first download, have default toolbar data in case a subsequent download is unavailable. Absent the present invention, dialog display data is included in the toolbar application and cannot be updated by the Internet content provider without the user reinstalling the toolbar application. In addition, numerous variations of the same dialog, for example, different languages, are limited by the desire to keep the toolbar application small in size. These are some deficiencies of known dialogs.

Utilizing the present invention cures these deficiencies since the Internet content provider can continuously update the toolbar application's dialog display data by sending updated dialog display data to the user in subsequent data feeds. In this way, the Internet content provider can change the look of a dialog without requiring the user to reinstall the toolbar application. In addition, the Internet content provider can send the dialog display data in an appropriate language based on the location of the user or the user's predetermined preferences.

During use of the downloadable toolbar by a user, in a preferred embodiment, when an event that calls for the display of a dialog occurs, the toolbar application creates a dialog object. Then, an instance of a web browser control is created and hosted in the dialog object's window. In other words, a regular windows dialog is used as a wrapper for a web browser. The Internet content provider can control the appearance of the dialog by loading preferred dialog display data, for example, HTML, into the web browser control. Additionally, wrapping the web browser in a dialog allows the dialog to display any rich content that can be displayed by a web browser, while continuing to be recognized as a dialog by the toolbar, other programs and the operating system.

Initially, a quickly loading web page such as a blank HTML page is loaded in the web browser control. Then, the dialog object is set as the custom handler for the web browser control. Following this step, the dialog display data, for example, HTML, is retrieved from the toolbar data. The HTML comprises information regarding the dialog object's hash values, such as, for example, the height and length of the dialog. The HTML also defines the look and placement of the information and buttons that the dialog displays.

Since the dynamic dialog uses a web browser control to display its content, and the dialog display data is received from the Internet content provider in subsequent downloads, the Internet content provider can readily provide updates to the dialogs displayed by the toolbar application at times chosen by the content provider. The content, such as, for example, the optimal language for a dialog, can thus be dynamically altered without requiring a reinstall or having to include all possible languages with the toolbar application. Dialog content can take the form of text, graphics, multimedia content, advertising, or other content that can be experienced by a user. Displayed dialogs can be modal or modeless, as a matter of choice.

In addition, other features of the toolbar application that are currently displayed to a user in the browser window and/or in a separate browser window can now be displayed by the toolbar in a dialog window, using the dynamic dialogs of the present invention.

Other objects and features of the present invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF EXEMPLARY EMBODIMENTS

There will now be shown and described in connection with the attached drawing figures several exemplary embodiments of a system and method of providing dynamic dialogs.

Figure 1:
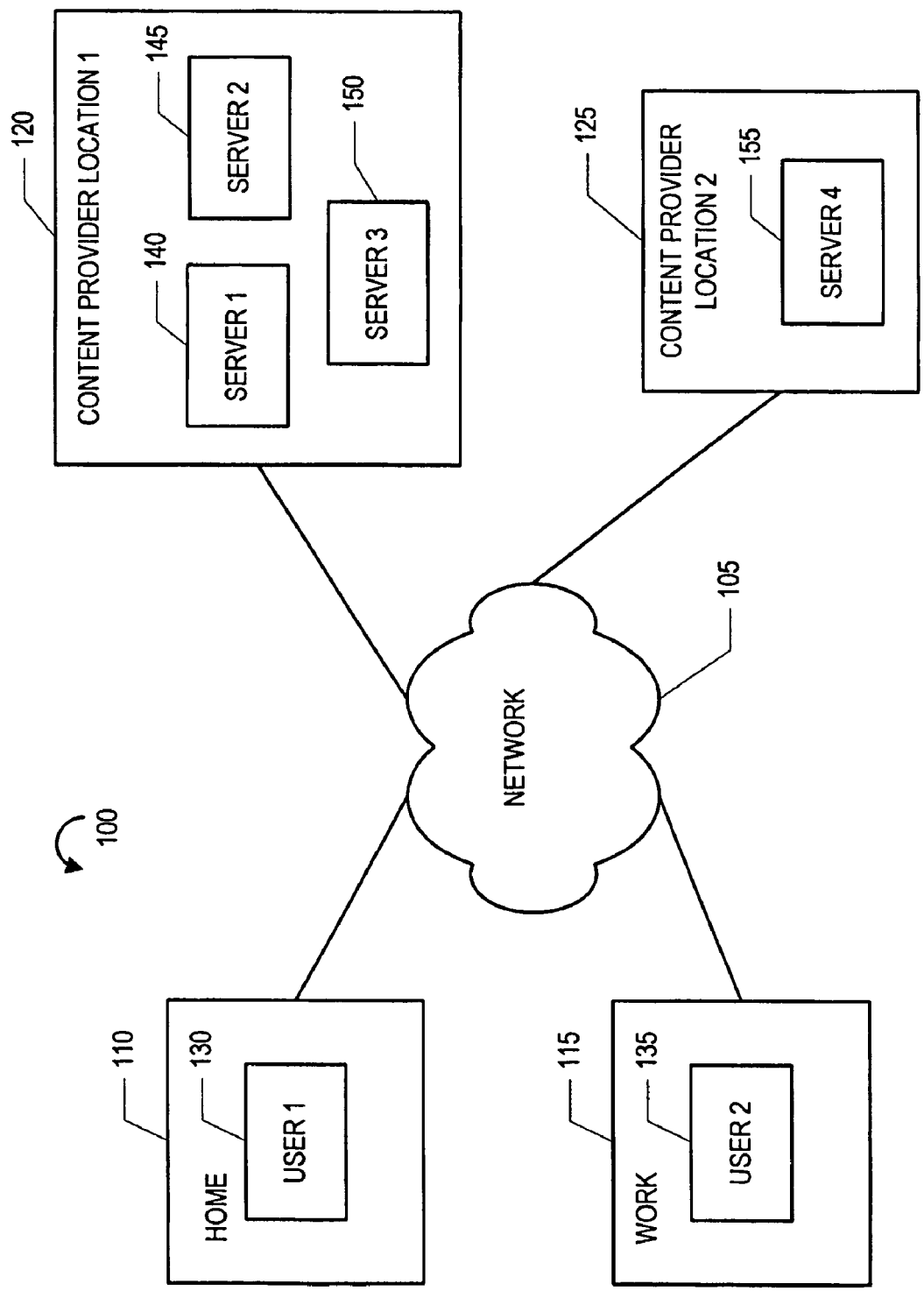
FIG. 1 is a schematic illustrating an exemplary system implemented according to an embodiment of the invention.

With reference to FIG. 1, there is shown an exemplary block diagram of a system 100 implemented in accordance with an embodiment of the invention. System 100 includes a network 105, and four locations: home 110, work 115, content provider location one 120 and content provider location two 125, each coupled to the network 105. In an embodiment of the invention the network 105 is the Internet, but in alternate embodiments, the system may also be used over any network of computers including local internets, intranets, local area networks (LANs), wide area networks (WANs), etc. or with any combination of networks.

In an exemplary embodiment, home location 110 is used by user one 130, and the work location 115 is used by user two 135. Both user one 130 and user two 135 utilize a network communication medium, for example, a computing device. As will be described later, the same user can use the invention at multiple locations, while maintaining their personal settings.

The methods and apparatus for providing dynamic dialogs is preferably provided and supported by an Internet content provider operating a predetermined Internet site, which can have one or more locations such as content provider location one 120 and content provider location two 125. FIG. 1 illustrates two locations, but a content provider is not limited in the number of locations it can utilize. Content provider location one 120 includes multiple servers, i.e., server one 140, server two 145 and server three 150; while content provider location two 125 includes one server, i.e., server four 155. Each of the servers can perform separate functions, alternatively one or more servers may perform one or more functions each. In addition, the content provider can place the servers 140, 145, 150, 155 in any location 120, 125 in any manner known, or to become known in the art. Further properties of the servers are described later with reference to FIG. 3.

Figure 2:
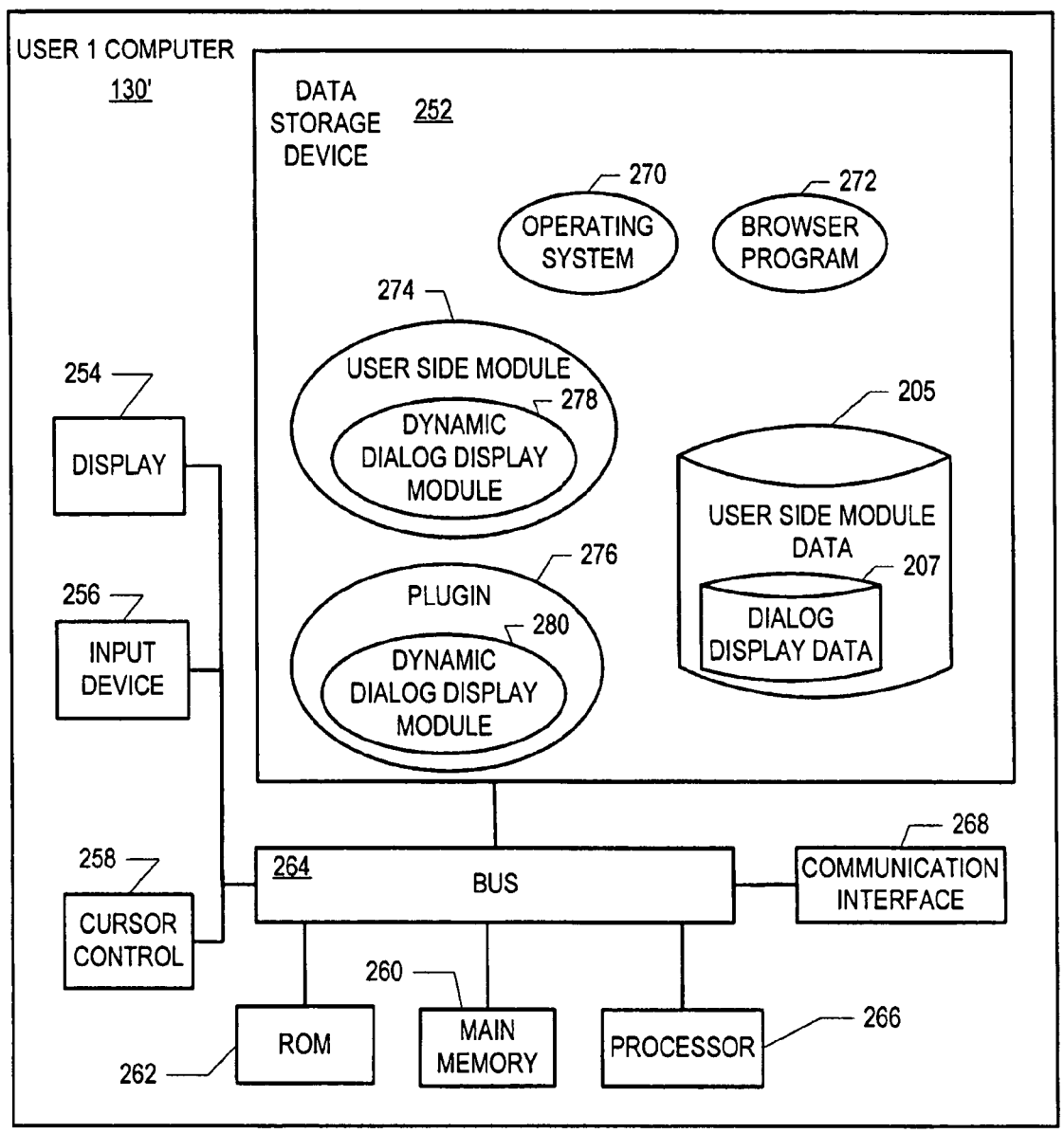
FIG. 2 is a schematic illustrating an exemplary user computer implemented according to an embodiment of the invention.

FIG. 2 illustrates an exemplary computer 130' that can be implemented as the computing device for user one 130 and user two 135. User computer 130' comprises a display 254, an input device 256, a cursor control 258, ROM 262, main memory 260, a processor 266, and a communication interface 268, coupled together by bus 264. The computer 130' communicates with the network 105 via the communication interface 268, which may be implemented as, by way of non-limiting example, a Network Interface card (NIC). The main memory 260 may be implemented as, by way of non-limiting example, Random Access Memory (RAM) and/or other dynamic memory storage device. Various input and output devices are provided as part of computer 130', including, by way of non-limiting example, a display 254, for example, cathode ray tube (CRT), liquid crystal display (LCD), etc., an input device 256 such as a keyboard, and a cursor control device 258 such as a mouse, or trackball, for example.

The computer 130' also includes a data storage device 252, which is coupled to the bus 264. The data storage device 252 may be implemented as, by way of non-limiting example, a magnetic disk drive and magnetic disk, a CD-ROM drive and CD-ROM, or other equivalent devices and data storage mediums. The storage device 252 stores, in known manners, computer code defining an operating system 270, a browser program 272, a user side module 274 and user side module data 205. Software and data stored in storage device 252 interoperate in manners known in the art. While depicted as a computer, the computing device may be any device, by way of non-limiting example, a notebook computer, personal digital assistant (PDA), cell phone and the like.

In accordance with an embodiment of the invention, and in the descriptions of exemplary methods and apparatus of the invention, user side module 274 may be implemented as a downloadable toolbar application 274 for a browser program 272. Of course the toolbar application can be provided via other distribution techniques, such as through physical medium containing the software. The preferably downloadable toolbar application 274 adds functionality to the browser program 272 that was not present in the browser program 272 prior to the download of the toolbar 274. An example of such toolbar is the Yahoo! Companion toolbar from Yahoo! Inc. These functions can include, but are not limited to, a search field, bookmarks, maps, music, etc. The downloadable toolbar application 274 may be, for example, a Dynamic Link Library (DLL). In addition, the user side module 274 preferably includes ActiveX control or Plug-in functionality.

The toolbar's 274 buttons are defined by user side module data 205. User side module data 205 may be implemented as toolbar data 205. In some embodiments, toolbar data 205 is received by the end user in a subsequent communication from the Internet content provider or other source, such communication referred to herein as a button feed or data feed. Both the terms button feed and data feed refer to a communication receiving during or after the toolbar application is downloaded, by which information is sent for use by or with the toolbar application. Some default toolbar data 205 may be included with the initial download of the toolbar 274, in case a subsequent download is not possible. The toolbar data 205 comprises icons, display text, and other information that the toolbar 274 uses to create and display its buttons to an end user. In addition to buttons, the toolbar data 205 can also include parameter data. This data comprises information that the toolbar 274 uses to provide additional functions and services to an end user. For example, strings for an email alert function such as, "You have 2 new messages," can be sent to the end user in a button feed as parameter data. The dynamic dialogs of the invention can also be sent to the end user as parameter data. In one exemplary non-limiting embodiment, display data for each dynamic dialog used by the toolbar is sent in the button feed as a separate parameter. Thus, in FIG. 2, user side module data 205 comprises dynamic dialog display data 207.

As mentioned earlier dialogs are temporary windows, used by software applications, such as downloadable toolbar 274, to give and/or obtain information to or from an end user. When an event that calls for the display of a dialog occurs, for example, the end user selecting the "about toolbar" menu item, the toolbar 274 displays a dialog through dynamic dialog display module 278. In an embodiment, dynamic dialog display module 278 can be computer code that defines classes for implementing dynamic dialogs.

In an exemplary non-limiting embodiment, dynamic dialogs are dialogs that use a web browser for their display. When an event that calls for the display of a dialog occurs, a dialog object is created and an instance of a web browser control is loaded in the display of the dialog object. The web browser control is first loaded with a blank HTML page before it is loaded with HTML received from an Internet content provider. The HTML is sent to the user through a button feed mechanism that is pre-configured in art-recognized manners for the Internet content provider's toolbar 274. The HTML can comprise scripts and other browser executable code. The Internet content provider can modify what is displayed in the dialog by modifying the HTML that is sent to the user in subsequent button feeds. Dialog content can take the form of text, graphics, multimedia content, advertising, or other content that can be experienced by a user.

One example of using dynamic dialogs rather than presently known, hand-coded dialogs is for easier localization of the toolbar application. Since the dialog display data is HTML, translating the toolbar's dialogs for different international and geographic locations can be handled by international producers without having to change or modify the toolbar application itself. Thus, a single toolbar application can be distributed around the world, and that toolbar application can retrieve and display local languages and features in its dialogs. The content provider preferably maintains language parameters for determining the language of the dialog display data sent to various users. Exemplary language parameters are geographical location, the language of the toolbar application, user preferences, etc. One or all of these parameters can be used to determine what language the dialog display data should be.

Also, an Internet content provider can update the contents of the toolbar application's dialogs without requiring the user to reinstall the toolbar application. The dialog's user interface can be updated by modifying the dynamic dialog display HTML that is controlled by the Internet content provider. The user receives the updates in their next button feed from the Internet content provider.

Further, the operating system and other programs view the dynamic dialog as a regular dialog rather than a separate browser. Therefore, third party pop-up blockers will not dismiss the dynamic dialog.

In some embodiments, data storage device 252 may also store a plugin 276 that also provides additional functionality to the toolbar 274. A pop-up blocker is an example of such a plugin 276. The plugin 276 comprises dynamic dialog display module 280. Dynamic dialog display modules 278 and 280 may comprise, in some embodiments, similar computer code, and perform similar functions.

In one non-limiting embodiment the dynamic display module 278, 280 may comprise the following exemplary classes that implement the dynamic dialog. A first exemplary class is CYCpnDlgWorker. The CYCpnDlgWorker class is a hash that can be used to set arbitrary values. It also implements IDispatch so that any script in the dialog display data 207 can call functions exposed by the dialog. These functions are based on IDs that the dialog sets at construction time by setting values on the hash with a function name and an ID. Some exemplary functions that can be supported include "help", "end", "set", "get", "worker", and "cnf". Their corresponding DISPIDs (dispatch IDs) are, respectively, 10,11,12, 15,16, and 17.

A second exemplary class is CYCpnDlg. In an exemplary embodiment, the CYCpnDlg class is the main dialog class used by the toolbar application. CYCpnDlg implements CDialogImpl (Windows dialog core), CYCpnDialogWorker (described above), and IDocHostUIHandler. The first one creates the dialog itself; the second allows the script in the dialog display data to call the functions described above; and the last one allows the dialog to take control of the UI of the web browser control that it hosts.

IDocHostUIHandler returns S_FALSE or E_NOTIMPL for many of the functions. For GetHostInfo( ), it queries the hash value for the flags that the toolbar application 274 wants to use for the web browser control. Valid values are those described in IDocHostUIHandler::GetHostInfo( ). CYCpnDlg specifies that it has DOCHOSTUIFLAG_DIALOG|DOCHOSTUIFLAG_NO3DBORDER in addition to any flags specified in the hash.

From an end user perspective, it is preferable that keyboard shortcuts used with a dynamic dialog should work like a regular dialog. While some keyboard shortcuts like ENTER and ESC may produce a desired result, other shortcuts such as TAB may not. In a known dialog, pressing TAB allows a user to navigate the focus of the dialog through the different items in the dialog. Since the only object in the exemplary dynamic dialog of the present invention is a web browser control, pressing TAB may not allow a user to navigate through the different dynamic dialog items displayed by the web browser without additional code.

One exemplary method of solving this problem is to use a custom dialog message loop when the dynamic dialogs are displayed. During this loop TranslateAccelerator is called on the IOleInPlaceActiveObject interface of the web browser control. In this function, which is implemented as part of the dialog class, the code does the following to make sure that if a keyboard message was a TAB, SHIFT-TAB, etc., that the web browser properly changes the focus.

The dynamic dialog data 207 is preferably written so that the dynamic dialog maintains the "look and feel" of a regular dialog. In an exemplary embodiment, the following events are called by the toolbar application 274 and the dialog display data 207 to appropriately maintain the look and feel of the dialog. The IDispatch::Invoke( ) function handles the DISPID calls from the web browser control as it loads HTML, for example, DISPID_BEFORENAVIGATE2, DISPID_DOWNLOADCOMPLETE, DISPID_DOCUMENTCOMPLETE, etc., as well as the calls from the script on the dialog display data that gets loaded into the browser control, for example, DISPID_DLG_END, DISPID_DLG_SETDATA, etc. Handling of exemplary DISPIDs is described below. Calls made by the script to the dialog, can look like this:

window.external.set("foo", 12)

DISPID_BEFORENAVIGATE2 is an event from the browser. In the handler for this ID, any navigation attempt for this browser is cancelled. That way the user cannot make the dialog's browser control go to a different URL.

DISPID_DOCUMENTCOMPLETE is also an event from the browser. If this is the event corresponding to the initial "blank HTML" loading, then the dialog object is set as the custom user interface handler for the web browser control. Then, the dialog display data is loaded into the browser control. Alternatively, if this is the event corresponding to the loading of the dialog display data, the HTML is parsed for the <BODY> element, and a pointer to its "onload" handler is retrieved. This handler is replaced with a custom handler in the dialog object. The custom handler centers the dialog on the screen before calling the original "onload" handler.

DISPID_AMBIENT_DLCONTROL is a third exemplary event from the browser. This event tells the browser to download images, videos, and sounds.

DISPID_DLG_HELP is an event called by script in the dialog display data, for example when a user selects a help button. In this embodiment, a new browser is opened to the help URL associated with the dialog. The dialog has an "id" in the hash which was set up by toolbar application at creation time. This id is used as a URL parameter to the help URL, for example, http://edit.companion.yahoo.com/
rd?.id=<ID>&.intl=<INTL>

The INTL is the country code of the current user, and the /rd entry point redirects the browser to a URL defined in a config file. In this way, the dialog behavior does not have to be changed if the help URL changes.

DISPID_DLG_SETDATA is a second exemplary event called by script in the dialog display data. This event sets the data value on the hash. Special hash values such as width, height, and title, involve extra processing aside from simply storing the key-value pair. The dialog window is resized using the width/height values and the dialog title is set.

DISPID_DLG_GETDATA is a third exemplary event called by script in the dialog display data. This event gets data values on the hash. Special keys include "cv" to get the caller version, "iv" to get the browser version, and "wv" to get the operating system version. Knowing this parameter allows the dialog display module 278 to do different things on specific platforms.

DISPID_DLG_END is a fourth exemplary event called by script in the dialog display data. This event tells toolbar application that the dialog should be dismissed. This function takes one parameter, i.e., the code that is returned from the dialog to the caller. Valid values are IDOK (1), IDCANCEL (2), IDYES (6), and IDNO (7).

DISPID_DLG_WORKER is a fifth exemplary event called by script in the dialog display data. Sometimes the code that calls the dialog has special logic to allow the dialog to call other functions or retrieve complex data that is not normally supported by the dialog. In this case a "worker" property, which is a custom IDispatch-derived object, is exposed to provide this functionality. For example, in a pop-up blocker dialog, a special worker object interfaces with the pop-up blocker and allows the dialog to query for an allow list, a block list, etc.

DISPID_DLG_CONFIRM is a sixth exemplary event called by script in the dialog display data 207. The confirmation dialog, where the user is prompted for a yes/no or ok/cancel answer, can be used directly by the toolbar application 274 like any other dialog, and it can be used by script on another dialog. This way, the dialogs can reuse the confirmation dialog that already exists. The script calls window.external.cnf (message, style, width, height [, helpID]), where "message" is the question/message displayed to the user, "style" is the Windows dialog box style (MB_OK, MB_ICONSTOP, etc.), "width" and "height" are the dimensions, and helpID is the optional "id" that navigates to a help URL if the dialog box offers a help button.

A third exemplary class is CYCpnDlgForPlugin. This class is a subclass of CYCpnDlg and is used for dynamic dialogs displayed by plugins. It uses most of the functionality from CYCpnDlg, with a few exceptions. First, CYCpnDlgForPlugin stores a pointer to the CYButton, the object that represents a button on the toolbar, so that it can query the button for information such as feed values, resource instance value, dialog display data 207 from the cache, etc. A dialog that originates from the toolbar application 274 can ask the toolbar application 274 for this information directly, but in this case the dialog originates from a plugin, so the dialog obtains the information using the plugin's mechanism for getting data, i.e., a pointer. Second, DoModal( ) is overridden and the CYButton object is used to gather any information required before calling CYCpnDlgForPlugin::DoModal( ).

In an exemplary embodiment, Cascading Style Sheets (CSS) can be used to implement a regular looking dialog using HTML. For example, HTML elements can be displayed to match known dialog buttons, colors and fonts.

Figure 3:
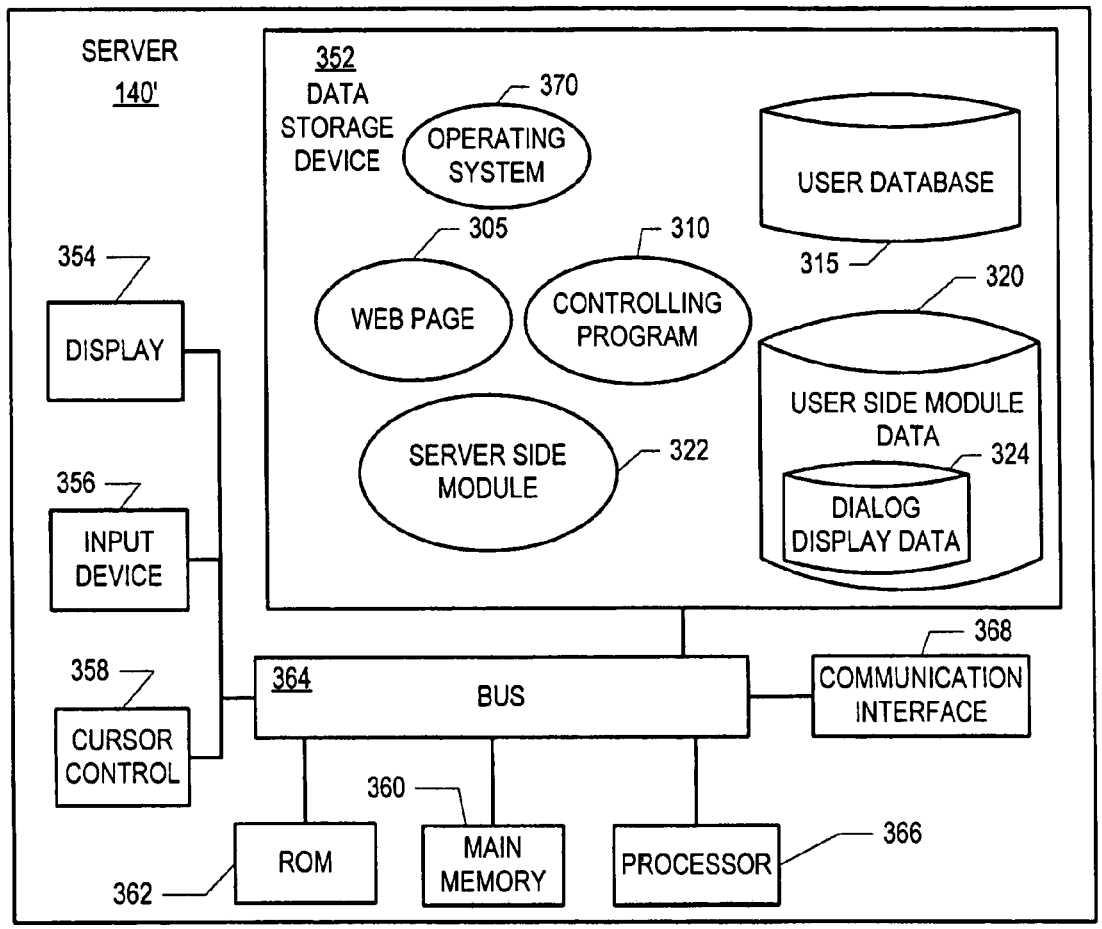
FIG. 3 is a schematic illustrating an exemplary server implemented according to an embodiment of the invention.

FIG. 3 illustrates an exemplary embodiment of server 140' that may be implemented as any of the servers one through four 140, 145, 150, 155 of system 100. Server 140' comprises a display 354, an input device 356, a cursor control 358, ROM 362, main memory 360, a processor 366, and a communication interface 368, coupled together by bus 364. In alternate embodiments the server 140' does not include the display 354, the input device 356 and the cursor control 358.

The server 140' also includes a data storage device 352, which is coupled to the bus 364. The data storage device 352 stores software such as an operating system 370, a web page 305, a controlling program 310, a server side module 322, a user database 315, and user side module data 320.

Server side module 322, in one non-limiting exemplary embodiment, can be implemented as a downloadable toolbar module 322. Downloadable toolbar module 322 controls the server side operations of providing a downloadable toolbar. These operations include receiving messages from users, determining the content of the message and performing actions in response to the message.

In accordance with an embodiment of the invention, an Internet user can obtain the user side module 274, which is, for example, implemented as a downloadable toolbar 274, by using their browser 272 to navigate to the Webpage 305 hosted at the server 140'. The webpage 305 may contain information about the downloadable toolbar 274 and links for obtaining the downloadable toolbar 274. In addition, the Webpage 305 may give users access to a program 310 for controlling the browser 272. When executed by the user, the controlling program 310 downloads or creates a toolbar 274 on the data storage device 252 of the Internet user's computer 130'.

Thereafter, when the Internet user executes the browser 272, the browser 272 opens the downloadable toolbar 274 and preferably automatically establishes a connection to the content provider's Internet site 140', through server side module 322. The content provider, in response to the connection established by the browser 272, sends user side module data 205 to the user via a button feed. In some exemplary embodiments, user side module data 205 may be implemented as toolbar data 205. The information and/or functional data is loaded into a shell operating within the browser and created by the downloadable toolbar 274. The server side module 322 determines what toolbar data 205 to send to an end user by examining several factors such as if the user is logged in, the geographic location of the user, etc., and retrieves the toolbar data 205 from user side module data 320. User side module data 320 comprises toolbar data that the content provider can send to its users in a button feed. The toolbar data 205 can also include supplementary data such as, for example, parameter data that includes data 207 to be displayed in a dialog. The dialog display data 207 for users is retrieved from dialog display data 324, which the server 140' stores, for example, as part of user side module data 320.

Users of the downloadable toolbar 274 can preferably maintain user accounts with the downloadable toolbar provider. User accounts are used to identify users on the Internet and to store user preferences. If the user has an account with the content provider, customized information and/or functionality may be loaded into the downloadable toolbar 274 or otherwise associated with the user. If the user does not have an account, more generalized (e.g., guest) information and/or functionality may be loaded. User information, such as, for example, user names, passwords, preferences, etc., is stored at the server 140' in user database 315. Maintaining a user account with the content provider gives the Internet user the additional benefit of having their toolbar preferences available at any location from which the user can access the content provider. Logging in with the content provider also allows the content provider to give the user a more personal experience since toolbar settings, such as, what a dialog displays, can be adjusted in accordance with the preferences of the user.

While exemplary server 140' includes a plurality of software modules 305, 310, 370, 322 and databases 315, 320, 324 as separate components, in alternate embodiments, one or more of the modules 305, 310, 370, 322 and databases 315, 320, 324 may be combined and/or separated to perform the functions of the combined and/or separated modules and databases. Additionally, while exemplary server 140' includes a plurality of modules 305, 310, 370, 322 and databases 315, 320, 324 in alternate embodiments the modules 305, 310, 370, 322 and databases 315, 320, 324 may be dispersed into separate servers in separate or similar locations. This is true for all software modules and databases described herein, whether at the server or user level.

Figure 4:
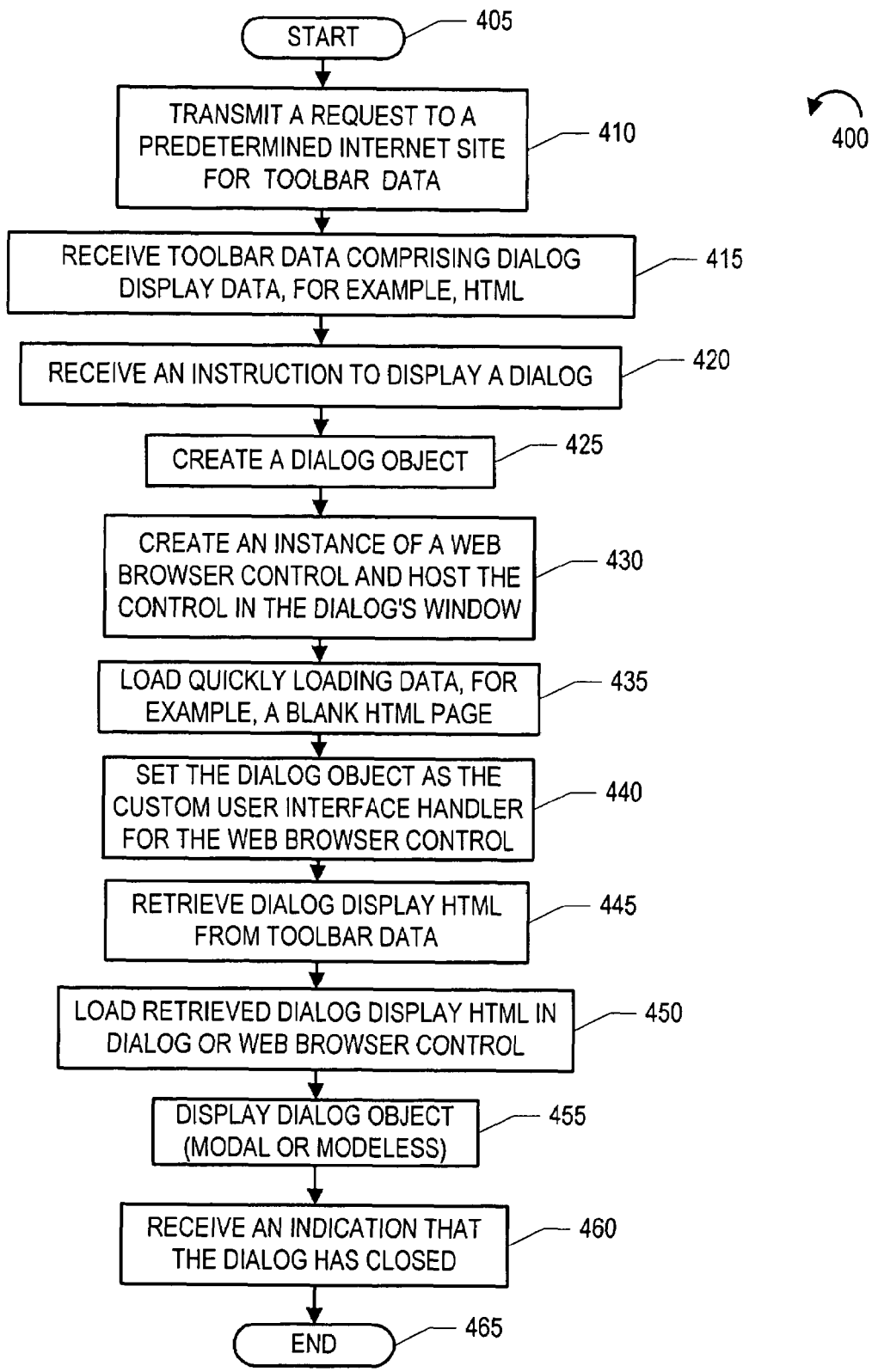
FIG. 4 is a flowchart illustrating an exemplary dynamic dialog display method implemented according to an embodiment of the invention.

FIG. 4, along with FIGS. 1 through 3, illustrate an exemplary dynamic dialog display method 400 that may be practiced for use with downloadable toolbar module 274 and dynamic display module 278 using toolbar data 205 and dialog display data 207. Method 400 is preferably initiated at start step 405, by an Internet user starting the operation of browser program 272. Processing proceeds from step 405 to step 410, where the downloadable toolbar module 274 transmits a request to a predetermined Internet site for toolbar data 205. In step 415, the toolbar module 274 receives the toolbar data 205 from the predetermined Internet site. The toolbar data 205 comprises dialog display data 207. Dialog display data 207 can be, in an embodiment of the invention, HTML. In other embodiments the dialog display data 207 can be computer code, URIs, multimedia, or anything else that can be loaded in a web browser control. The HTML 207 is capable of including scripts, such as, for example, JavaScript, and links to additional data that can be obtained and loaded in the dialog. The HTML may be cached at the user's computer 130' using the toolbar application's 274 existing caching mechanism. Updates to the HTML can be sent down to the user in a feed when they are available; otherwise, the toolbar application uses what is in the cache.

From step 415 processing proceeds to step 420 where the toolbar module 274 or other software component recognizes an event that calls for the display of a dialog, such as when the toolbar module 274 receives an instruction to display a dialog. This instruction may have been received, in one non-limiting example, by the user selecting a toolbar menu item that displays information, such as the toolbar's version number, about the toolbar 274. In some embodiments, at least some of the exemplary IDispatch logic described earlier is used to perform the following steps.

In step 425, the toolbar application 274 with dynamic dialog display module 278 creates a dialog object. Processing proceeds from step 425 to step 430, where the dialog display module 278 creates an instance of a web browser control and hosts the control in the dialog objects window. In one exemplary embodiment, step 430 is performed at initialization time (WM_INITDIALOG handler). Then, in step 435, a quickly loading webpage, such as, a blank HTML page is loaded in the web browser control.

Processing proceeds from step 435 to step 440, where the dialog object is set as the custom user interface handler for the web browser control. The dialog object handles the external user interface for the web browser control.

After step 440, processing proceeds to step 445 where dialog display HTML 207 is retrieved from toolbar data 205. In one exemplary, non-limiting embodiment, the plugin cannot directly access toolbar data 205. Therefore, while dialogs originating from dynamic dialog display module 278 can obtain dialog display HTML 207 directly from toolbar data 205, dialogs originating from dynamic dialog display module 280 use mechanisms in the plugin 276 to communicate with the toolbar application 274, which can obtain the desired dialog display HTML 207. After the dialog display HTML 207 is retrieved in step 445, processing proceeds to step 450, where the retrieved dialog display HTML 207 is loaded in the web browser control. In other embodiments, additional data and/or media is obtained from the network and loaded in the web browser control, when the dialog display HTML 207 comprises instructions to obtain them.

Once the dialog display HTML 207 is loaded in the web browser control, in step 450, processing proceeds to step 455, where the dialog is displayed to the user. In one exemplary embodiment, a custom message loop is used to properly process messages that occur, so that the dynamic dialog acts like a regular dialog. The dialog displayed may be modal or modeless.

After the user has finished with the dialog, processing proceeds to step 460, where the toolbar module 274 receives an indication that the dialog has closed. For example, the dynamic dialog display module calls "end( )" on the window.external object. When the dialog closes, it returns a code to the toolbar application 274 as though it were a regular dialog, for example IDOK, IDCANCEL, IDYES, IDNO, etc. The toolbar application 274 can use the return code to determine what course of action to take. Method 400 ends in step 645, with for example, the user closing the browser program 272. Until the browser program 272 is closed, method 400 can return to step 420, when new instructions to display dialogs are received.

Figure 5:
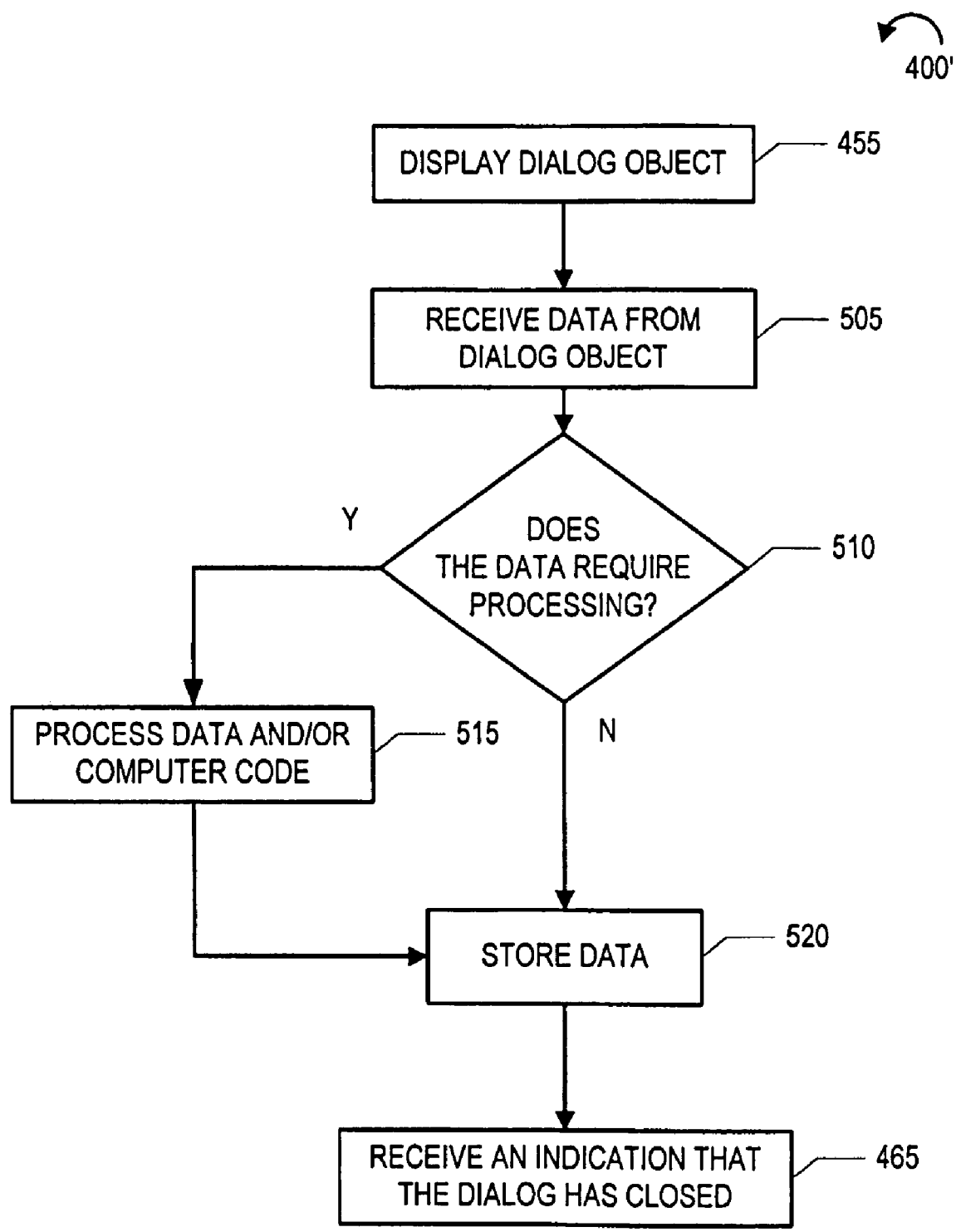
FIG. 5 is a flowchart illustrating an alternate embodiment of the exemplary dynamic dialog display method of FIG. 4.

FIG. 5 illustrates an alternate embodiment of dynamic dialog display method 400. In this embodiment, the toolbar 274 includes a plugin 276, such as a pop-up blocker that uses a dialog to retrieve information from the user. Therefore, after the dialog is displayed in step 455, processing proceeds from step 455 to step 505 where the toolbar module 274 receives data from the dialog object. This information can include, for example, recently blocked websites that a user wishes to allow pop-ups from in the future. In alternate embodiments, the data can be computer code instructing the toolbar module 274 to perform additional functions such as sending data to the predetermined Internet site.

Processing proceeds from step 505 to step 510 where the toolbar module 274 determines whether the data requires processing. If the data does not require processing, the toolbar 274, in step 520, stores the data received from the dialog object. On the other hand, returning to step 510, if the toolbar 274 determines that the data requires processing, then method 400' proceeds from step 510 to step 515, where the toolbar 274 processes the data and/or computer code received from the dialog object. The additional processing can include navigating to a new web site, sending data to and receiving data from the predetermined Internet site, etc. Then, processing proceeds to step 520 where any data obtained from the dialog object and/or from the processing of the computer code received from the dialog object is stored. After any data is stored in step 520, processing proceeds to step 465 of method 400, and proceeds as described above.

Figure 6:
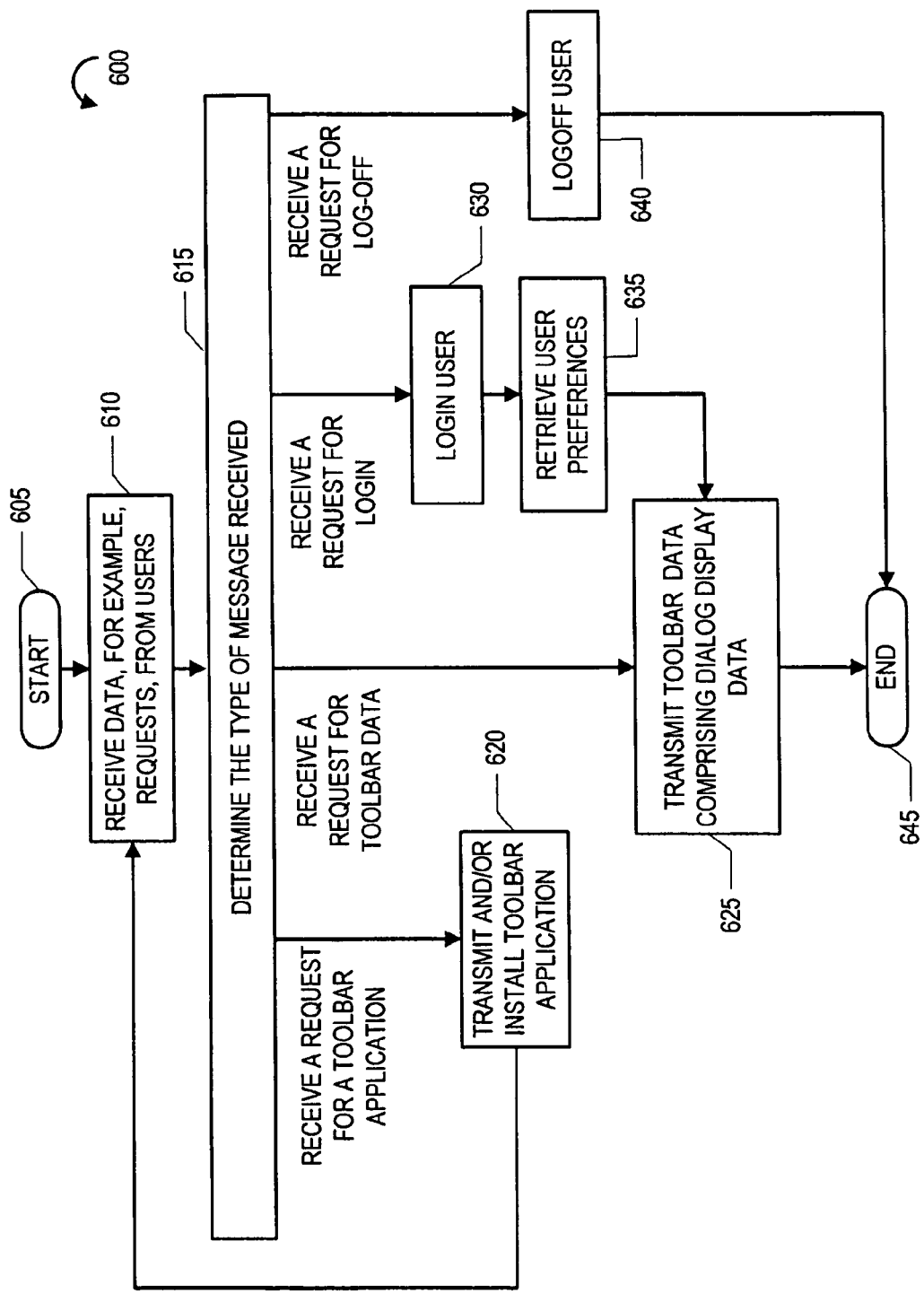
FIG. 6 is a flowchart illustrating an exemplary server side method implemented according to an embodiment of the invention.

FIG. 6 illustrates an exemplary server side method 600 that may be performed by server side module 322. The order of the steps of method 600 and other methods of the invention illustrate a non-limiting exemplary embodiment of the order of the steps of the methods. In alternate embodiments the order of the steps may vary. The server side method 600 is an exemplary method that a predetermined Internet site can use to provided dynamic dialogs. Method 600 starts in step 605, for example, with the server 140' monitoring for messages from the network 105. In step 610, server 140' receives data from a network 105 user. Server 140' can receive data from a plurality of different users and the data may comprise different types of messages. For example the message may be, but is not limited to, a request for a toolbar application, a request for toolbar data and/or a request to log-in or log-off. Therefore, in step 615, server 140' determines the type of message received. Depending on the message type, the server 140' performs different actions.

In one non-limiting embodiment, dynamic dialogs are used with a downloadable toolbar application 274. Therefore, a user that downloads and installs the toolbar 274 for the opportunity to experience dynamic dialogs. If the server 140' determines, in step 615, that the received message is a request from a user for a toolbar application 274, processing proceeds to step 620, where the server 140' transmits and/or installs a toolbar application 274 on the user's computer. In an exemplary embodiment, a user obtains a toolbar application 274 by connecting with a predetermined Internet site. Using a controlling program 310, the Internet site downloads and/or installs a toolbar application 274, on the user's computer 130'. The toolbar application 274 may be a library file.

Once the toolbar application 274 is obtained by the user, processing returns to step 610 where the server 140' receives data from the user. Following step 610, in step 615, the server 140' determines that the data is a request for toolbar data 205. Processing then proceeds to step 625 where the server 140' transmits toolbar data 205 to the user. The toolbar data 205 comprises information defining the buttons that make up the downloadable toolbar and also comprises dynamic dialog display data 207. Following step 625, processing proceeds to step 645 where the method 600 ends, and the server 140' returns to monitoring for messages from network 105 users.

When the user subsequently accesses their browser program 272, the toolbar application 274 transmits a request for toolbar data 205. Therefore, server 140' also receives requests for toolbar data from many users who have already installed the toolbar application, without first receiving a request for the toolbar application 274. The Internet content provider can also transmit toolbar data 205 to connected users without receiving a request. The content provider may wish to do this to update dialog display data 207.

Returning to step 615, if the server 140' determines the received message is a "request for log-in", processing proceeds from step 615 to step 630 where the server 140', through server side module 322, logs in the user who sent the request. Then, in step 635, the server 140' retrieves the user's preferences from user database 315. The user's preferences may include the type, quantity and order of the buttons on the toolbar 274 or other user information that can be used to effect the toolbar 274. After the server side module 322 retrieves the user's preferences, processing proceeds from step 635 to step 625 where the server 140' transmits the users preferred toolbar data 205 to the user. This can be accomplished, in one non-limiting embodiment, through a button feed to the user. Then, processing proceeds from step 625 to step 645 where the method 600 ends, and the server 140' returns to monitoring for messages from network 105 users.

Returning to step 615 if the server 140' determines that the type of message received is a "request for log-off", processing proceeds to step 640 where server 140', logs the user out off of the predetermined Internet site. Following step 640, processing proceeds to step 645 where the method 600 ends, and server 140' returns to monitoring for messages from network 105 users.

Figure 7:
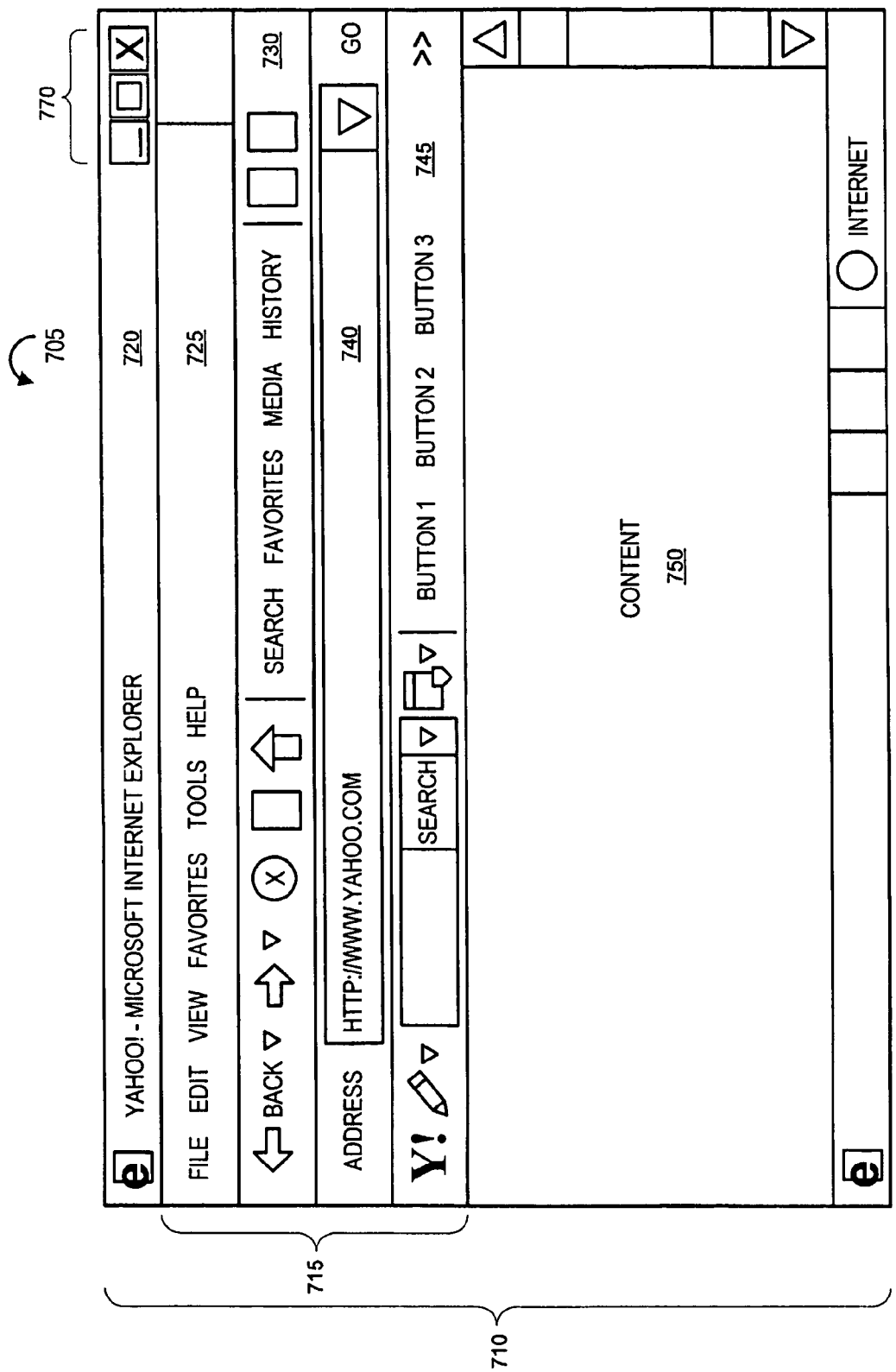
FIG. 7 is a wire frame diagram illustrating an exemplary browser implemented according to an embodiment of the invention.

FIG. 7 depicts an exemplary browser 705 implemented according to an embodiment of the invention. Browser 705 includes a plurality of windows, each providing various functionality to the Internet user. The browser 705 may comprise a first application window 710 that typically defines the general size, color, and layout of the browser 705 and includes window control buttons 770 (e.g., minimize, close, etc.) for that application window 710. The browser 705 may also comprise a webpage display area 750 and toolbar/menu bar portion 715. The webpage display area 750 and the toolbar/menu bar portion 715 typically define information and/or functionality that will assist an Internet user when accessing and navigating the Internet, for example, in the form of toolbars, pull-down menus, Plug-ins, applications, etc.

For example, the toolbar/menu bar portion 715 provided at the top (see FIG. 7) of the application window 710 includes one menu bar 725, an address bar 740, and toolbar 730 which may include a variety of interface controls such as, for example, pull-down menus, functional buttons (e.g., stop, back, forward, home, etc.), and a combination of functional buttons and windows (e.g., a search button and window). Toolbar 745 is implemented by user side module 274 and provides added functionality to the browser such as a search field and the dynamic dialogs of the present invention. In an embodiment of the present invention the dialog display data 207 may be included with the bottom most toolbar 745 as parameter data.

Figure 8:
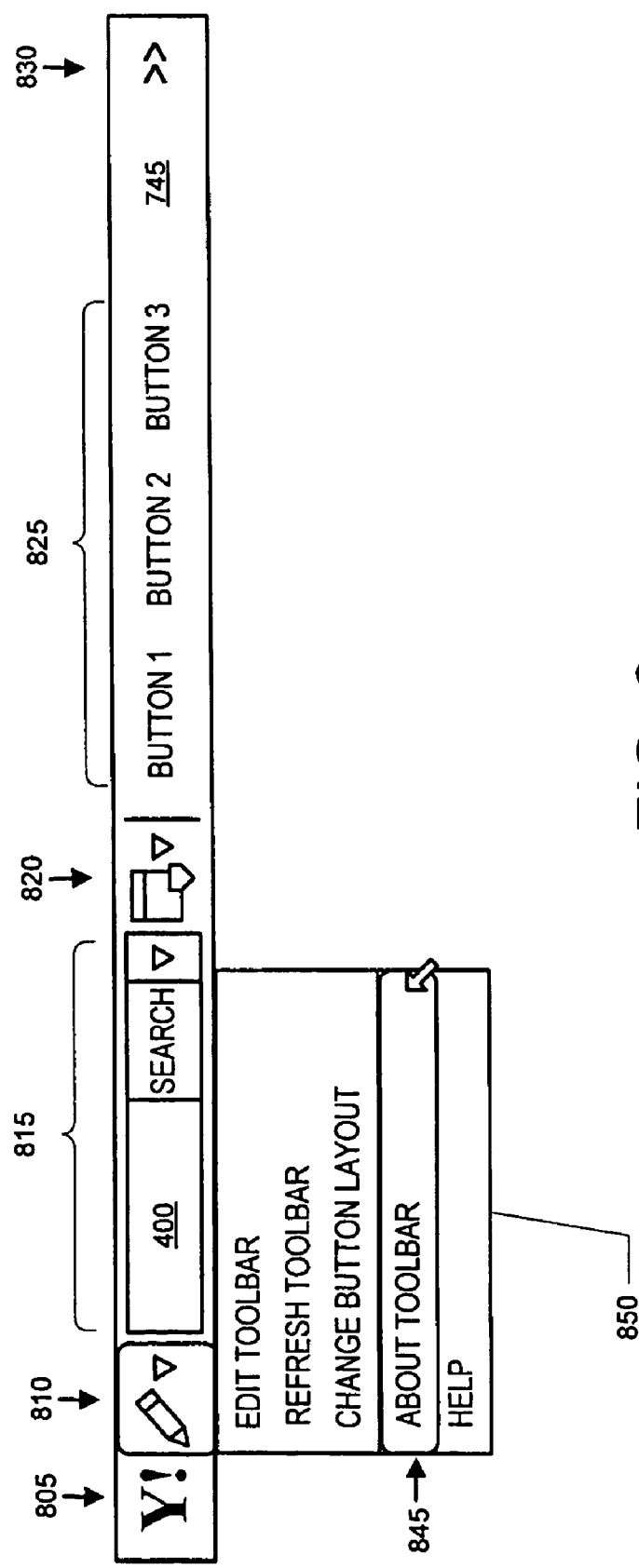
FIG. 8 is a wire frame diagram illustrating an exemplary downloadable toolbar implemented according to an embodiment of the invention.

FIG. 8 depicts an exemplary downloadable toolbar 745 implemented in accordance with the invention. Toolbar 745 comprises one or more buttons to provide functionality to an Internet user, such as, for example, a shortcut to a predetermined web site 805, a toolbar settings button 810, a search region 815, which includes a search field and a search button, a pop-up blocker button 820, and a button region 825 that can include buttons for bookmarks, maps, music, shopping, e-mail, etc. Button 830 creates a drop down menu including more toolbar buttons for an Internet user.

FIG. 8 also illustrates a user selecting an exemplary menu item, i.e., the "about toolbar" menu item 845, that calls for the display of a dialog. When a user selects toolbar settings button 810 a drop down menu 850 appears. If a user selects the "about toolbar" menu item 845, a dynamic dialog including information about the toolbar appears as illustrated in FIG. 9.

Figure 9:
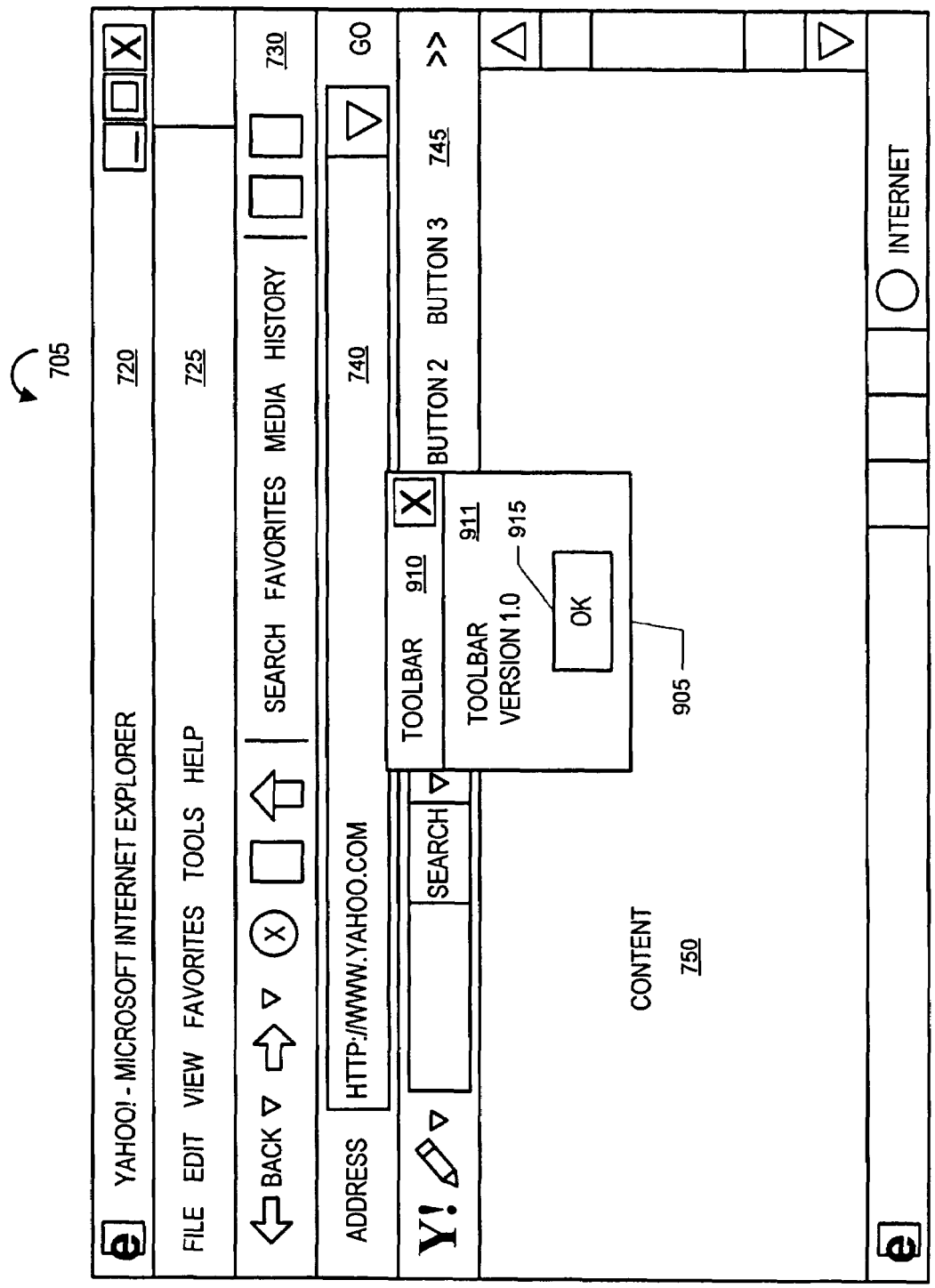
FIG. 9 is a wire frame diagram illustrating an exemplary browser and a dynamic dialog implemented according to an embodiment of the invention.

FIG. 9 illustrates an exemplary dynamic dialog 905 displayed over browser 705. The dialog 905 comprises a title region 910 and a display region 911. The title of the dialog is "Toolbar" and the display region 911 includes the information regarding the toolbar, for example in FIG. 9, the display region shows, "TOOLBAR VERSION 1.0". A user can dismiss the dialog by selecting the OK button 915 or the "X" in the title region 910.

Figure 10:
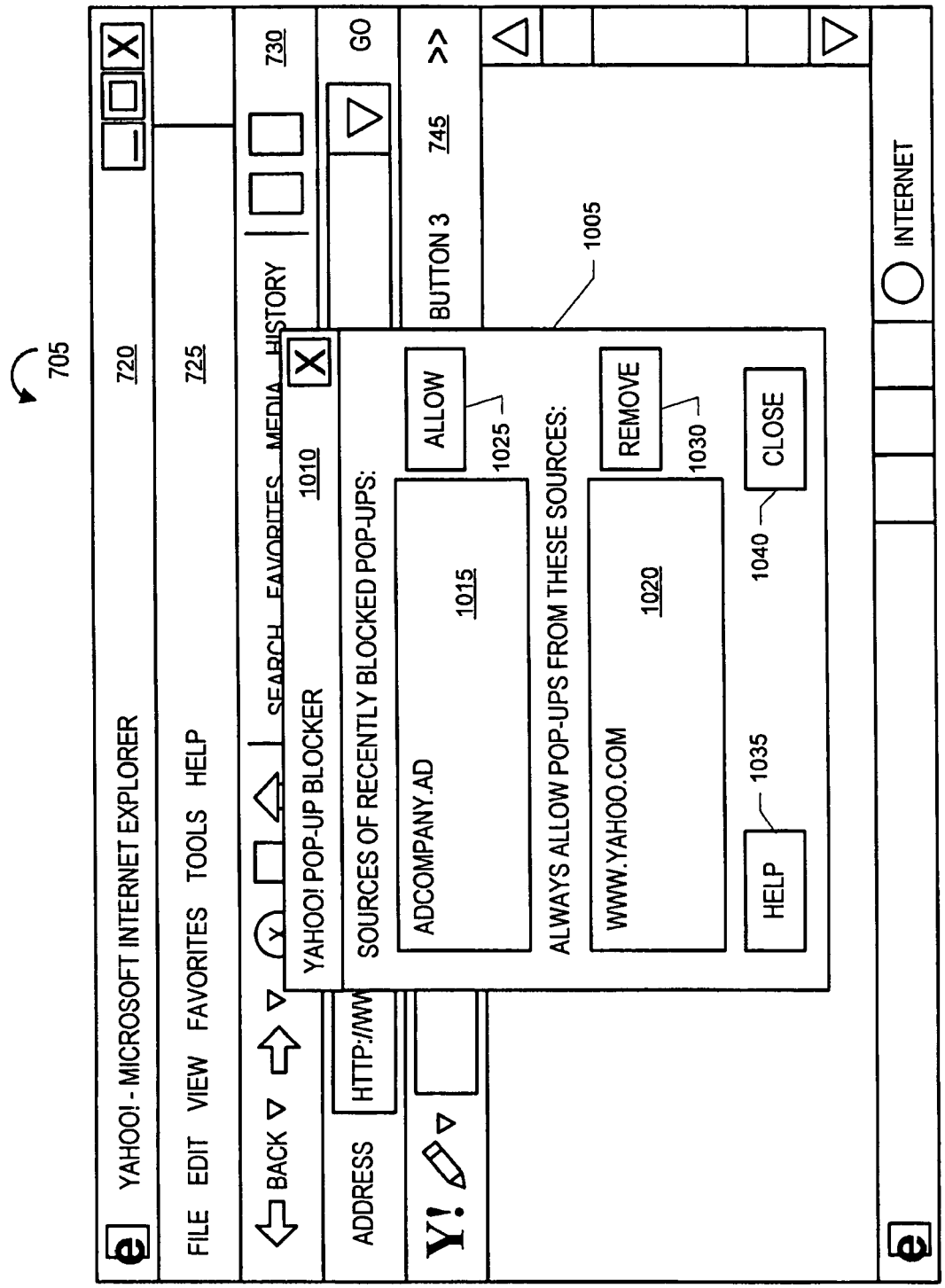
FIG. 10 is a wire frame diagram illustrating an exemplary browser and a dynamic dialog used with a pop-up blocker plugin implemented according to an embodiment of the invention.

FIG. 10 depicts an exemplary browser and a dynamic dialog used with a pop-up blocker plugin implemented according to an embodiment of the invention. Pop-up blocker dialog 1005 comprises a title region 1010 labeled, "Yahoo! Pop-up Blocker", a display region comprising a list of sources of recently blocked pop-ups 1015, an allow button 1025 for adding sources to a list of sources to allow pop-ups from 1020, a remove button 1030 for removing sources from the allow list 1020, a help button 1035 and a close button 1040.

The pop-up blocker dialog 1005 can be implemented, in one exemplary embodiment, by the dynamic dialog display module 280 and dialog display data 207 using the exemplary classes and exemplary methods described above.

Dialog display data 207 is included as part of the button feed from the predetermined Internet site to the toolbar user. The dialog display data may be, in one non-limiting example, implemented as HTML comprising CSS, JavaScript, etc. The function and variable names in the HTML can be in one non-limiting embodiment, a minimum length to save bandwidth. In alternate embodiments, a preprocessor can be written so that the HTML and script can be written with a large quantity of white space and long variable names, and then compressed before it is sent to a user in a feed.

Figure 11:
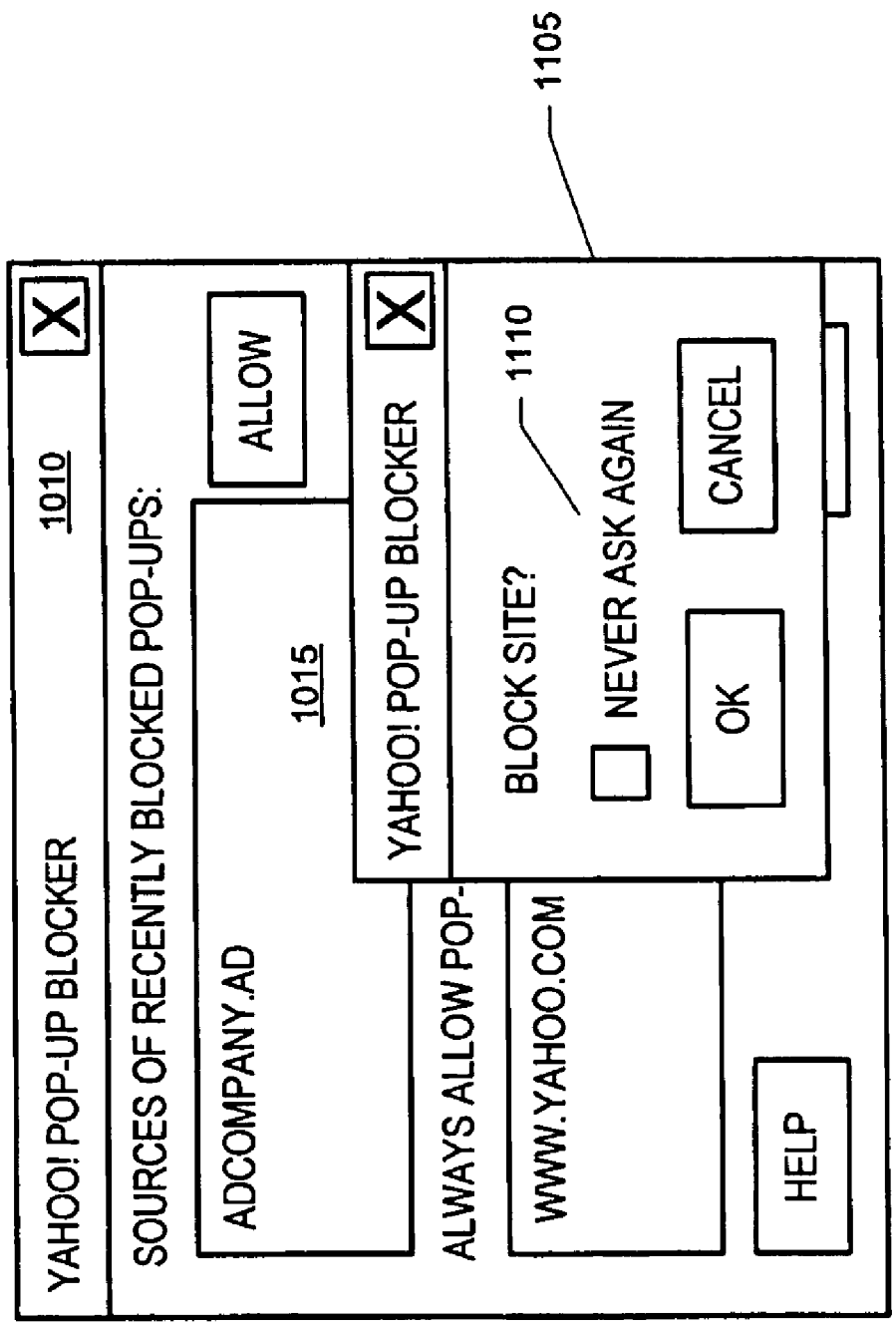
FIG. 11 is a wire frame diagram illustrating an exemplary confirmation dynamic dialog implemented according to an embodiment of the invention.

If a user selects a source from list 1020 and selects the remove button 1030, the pop-up blocker displays a confirmation dialog. FIG. 11 depicts an exemplary confirmation dynamic dialog 1105 implemented according to an embodiment of the invention. The confirmation dialog 1105 asks the user to confirm their previous action by selecting an "OK" button. The user can cancel their last action by selecting the "Cancel" button or the "X" in the title region. The confirmation dialog of FIG. 11 also allows the user to select a check box 1110, that bypasses the confirmation step in subsequent actions.

Figure 12:
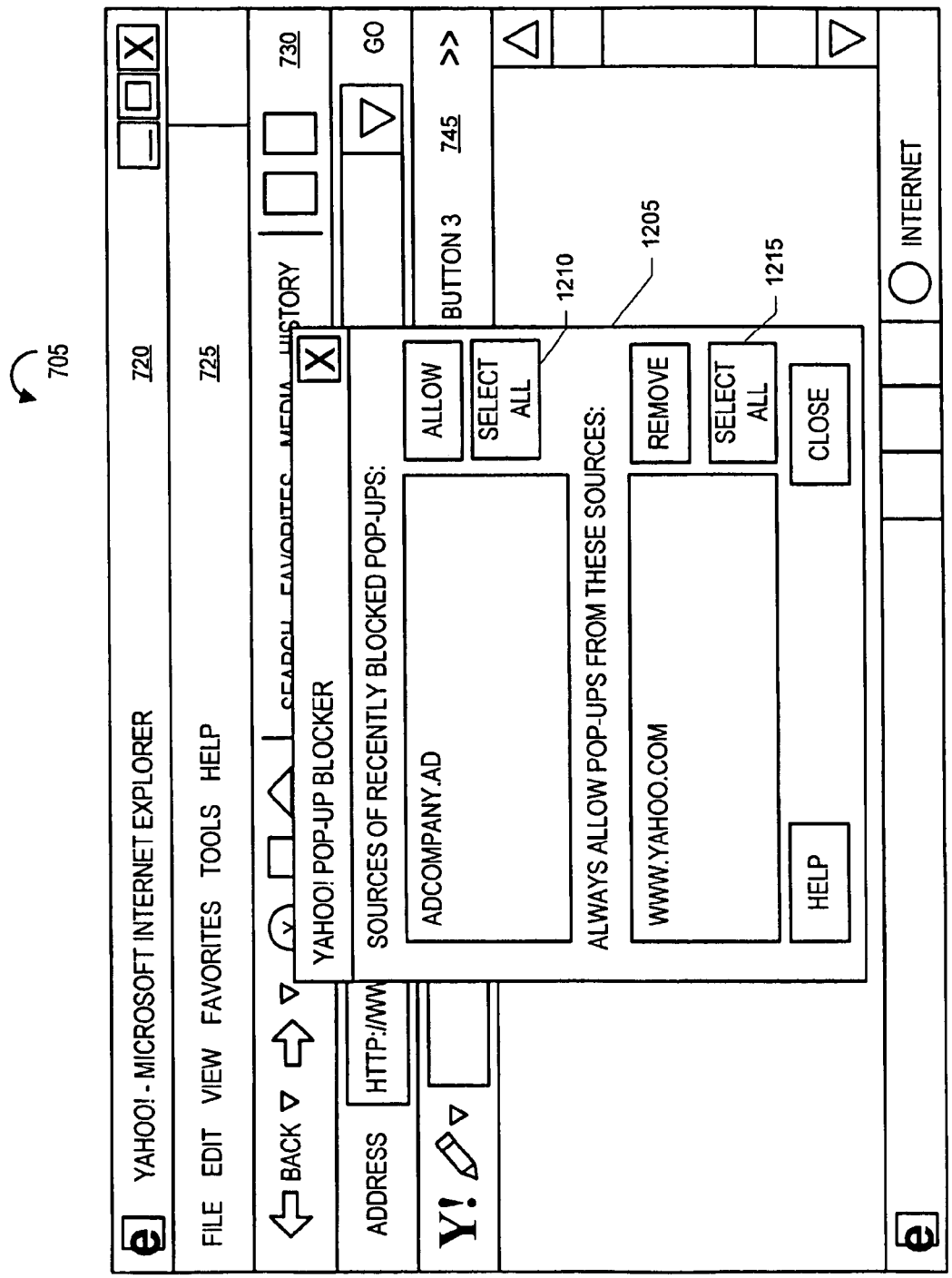
FIG. 12 is a wire frame diagram illustrating a modified pop-up blocker dynamic dialog.

The present invention allows content providers to make changes to dialogs without having to compel the user to reinstall their software. FIG. 12 depicts an alternate embodiment 1205 of the pop-up blocker dialog 1005 of FIG. 10. Dialog 1205 further includes "select all" buttons 1210 and 1215 that assists users in setting up their pop-up blocker preferences. In an exemplary non-limiting embodiment the content provider updates pop-up dialog 1005 with dialog 1205 via a subsequent button feed to the toolbar 274 as described earlier. One exemplary benefit of the present embodiment is in providing the ability to dynamically modify an application's dialogs between version releases gives the content provider a competitive advantage since they can make corrections to any software bugs and implement user suggestions with ease.

Figure 13:
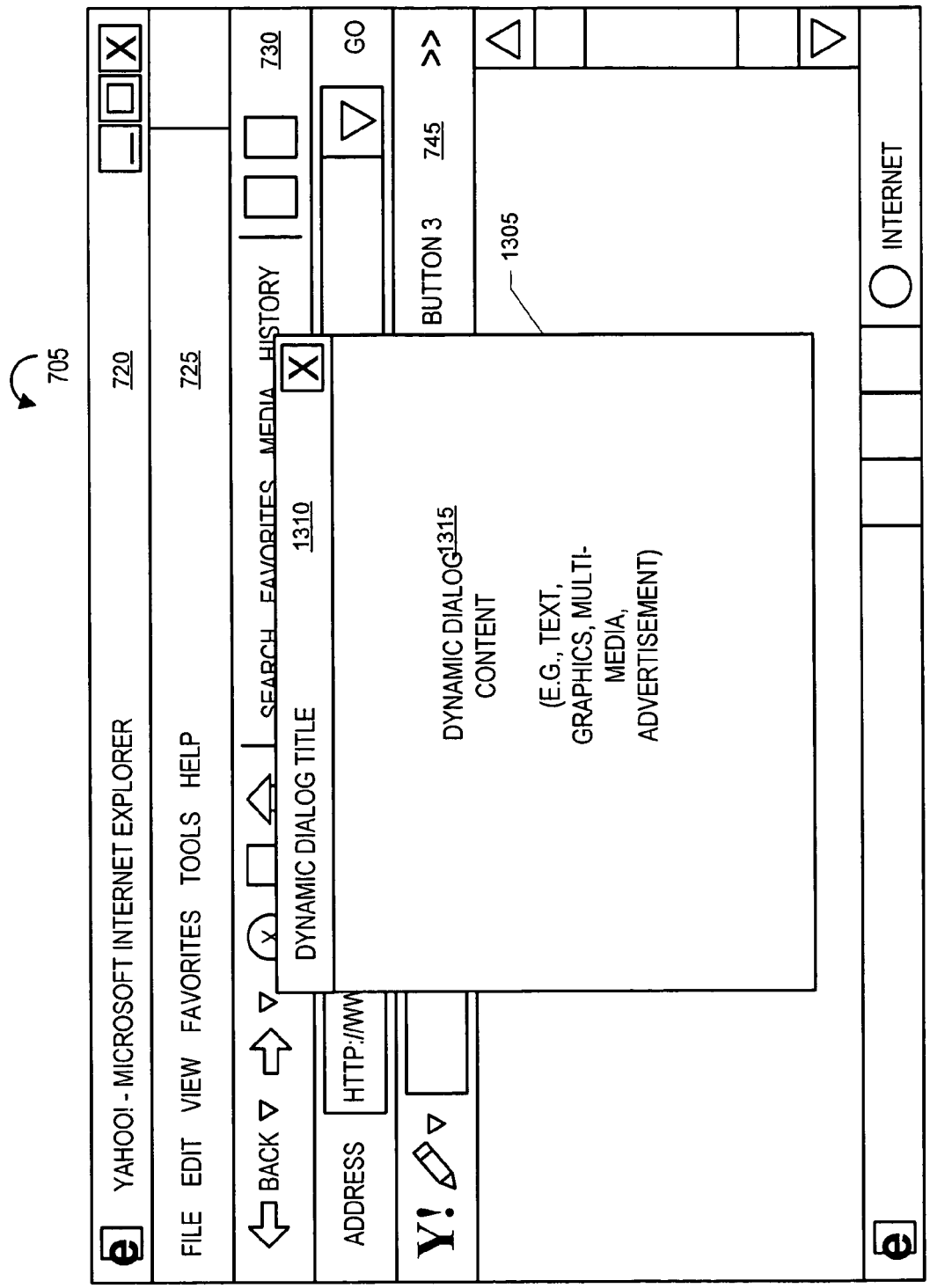
FIG. 13 is a wire frame diagram illustrating an exemplary browser and a generic dynamic dialog implemented according to an embodiment of the invention.

FIG. 13 depicts an exemplary browser 705 and a generic dynamic dialog 1305. Generic dynamic dialog 1305 includes a title region 1310 and a content region 1315. The content region 1315 comprises a web browser control, thus, anything that can be transmitted and/or displayed over the Internet through a Web browser can be loaded into the dialog. For example the dialog content can be text, graphics, multimedia information, advertising or other information. In some embodiments, the dynamic dialog 1305 may be modified to be a client-only wizard or a property page with multiple tabs. The wizard can have multiple dialog screens, back/next buttons, finish button, etc.

Furthermore, the dynamic dialog 1315 may be used with a toolbar's 274 automatic update feature. Instead of just displaying a standard windows dialog that says "do you want to autoupdate? yes/no", a content provider can offer the toolbar 274 user a richer experience by sending additional web content with the autoupdate confirmation. This information may be a list of new features or a tour of the new toolbar 274 updates. Some users do not want to go to a separate web page to view the new features, but they might watch an update video highlighting new features if it is included with the autoupdate confirmation.

In other embodiments, the dynamic dialog 1305 may be modified to assist plugins such as the pop-up blocker, and other toolbar functions to promote themselves. When a new feature is used for the first time, for example, a pop-up is blocked, a dynamic dialog 1315 may appear to alert the user that the pop-up blocker is installed and is working to make their web experience better. The dialog can include promotional information related to the newly used feature to further educate the user about the features of the toolbar 274.

Still in other embodiments, the dynamic dialog 1315 may be modified to include an options and/or preferences interference. A toolbar 274 user can change their preferences through the dialog 1315 instead of through a separate webpage. Exemplary functionality includes add/remove buttons, ordering buttons, etc.

The dynamic dialog 1315 can also be modified, in other embodiments, to display web content that is normally displayed in a webpage display area. For example, pressing the "maps" button on the toolbar 274, in a known embodiment, navigates the webpage display area to the maps webpage, leaving the website currently being viewed by the user. Using an embodiment of the invention, the maps webpage or a special maps webpage that looks like a dialog, can be displayed in dynamic dialog 1315 instead of the webpage display. The user can use the maps feature without leaving their current website.

The look and functionality of the "maps" button is defined in toolbar 274 by maps button data included in downloadable toolbar data 205. In the known, embodiment the maps button data may comprise an instruction to redirect the webpage display area to a specific URL. In an exemplary embodiment of the invention, where the maps functionality is presented in a dialog, the maps button data comprises HTML that defines the display of the maps dialog and/or refers to the location of display data to be loaded in the dialog. The maps button data and any other display data is loaded in the dialog and then displayed to the user as described above. This method can be used for any toolbar 274 feature that redirects the browser to another webpage, opens a new browser, etc, and for other features.

Figure 14:
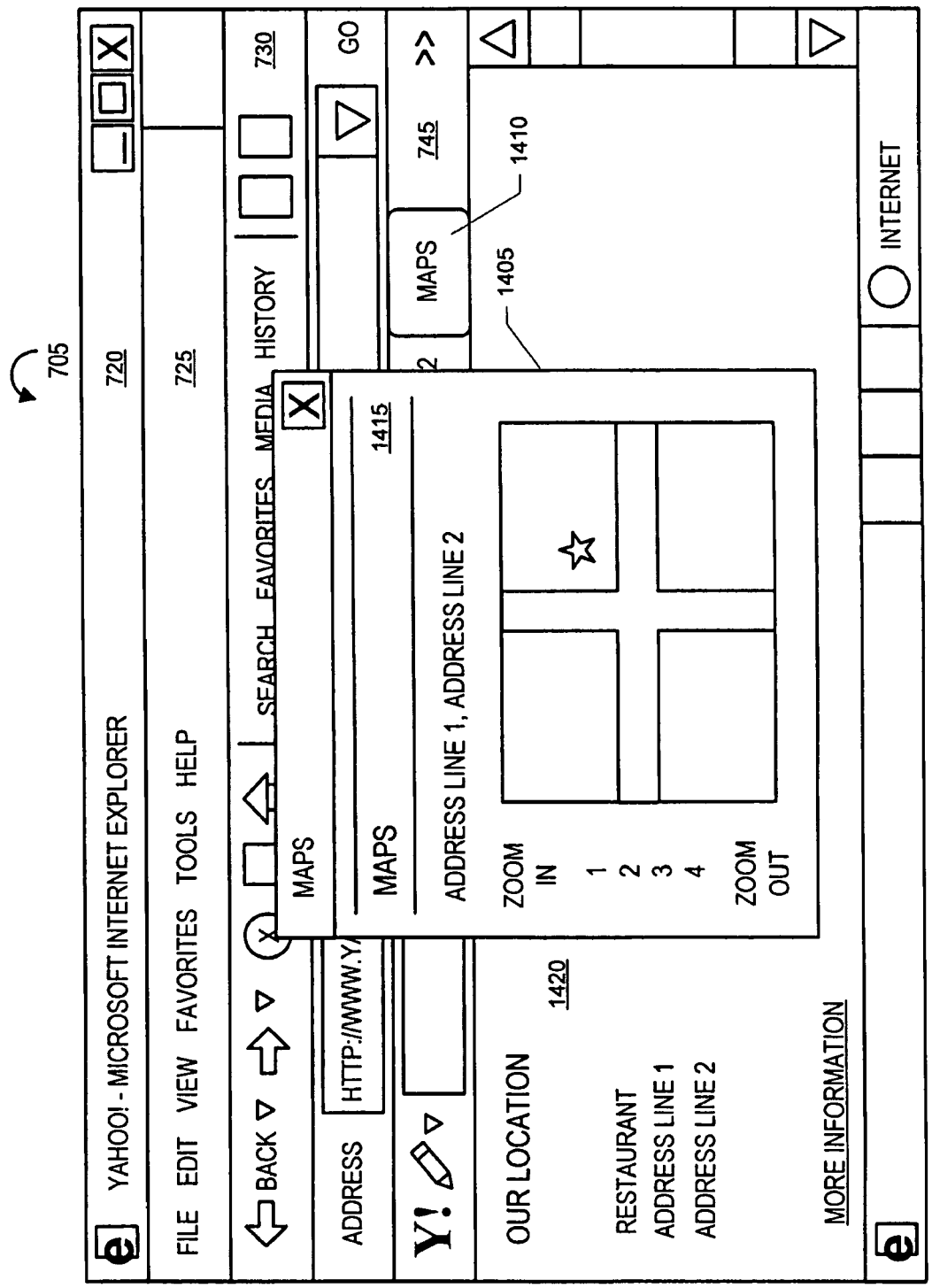
FIG. 14 is a wire frame diagram illustrating an exemplary browser and a Maps dialog implemented according to an embodiment of the invention.

FIG. 14 depicts an exemplary use of an embodiment of the present invention. Maps dialog 1405 implemented in accordance with an embodiment of the invention. In FIG. 14, a user searching for the address of a restaurant navigates to the restaurant's website or site having information about the restaurant 1420. In order to find the exact location of the restaurant, the user utilizes the Maps function of toolbar 745. In this exemplary embodiment of the invention, instead of redirecting the browser 705 to a different webpage, dialog data in the form of a Maps webpage is loaded in a dialog when the user presses Maps button 1410. Thus, the restaurant webpage 1420 remains displayed by the browser 705, and the user can enter a copy the address directly into the maps webpage. After the address is entered, the dialog displays the location of the restaurant 1415. In other embodiments, the address can be automatically obtained by the toolbar 745, for example, directly from the restaurant webpage 1420 and/or from a database maintained by the content provider. Since the restaurant webpage 1420 is not dismissed, the user can easily go back to the webpage 1420 and access more information about the restaurant, if they desire.

Using a dialog to display the Maps webpage, allows the content provider to make the Maps webpage look and feel as if it is a function of the toolbar 745 rather than a webpage. In addition, as mentioned above, since the Maps webpage is loaded in a dialog rather than another browser window, third party Pop-up blockers will not block the Maps webpage.

Exemplary implementations of the dynamic dialogs of the present invention can be used for internationalization through the provision of dynamic dialog content in differing languages, or for the provision of any information to a user through the use of a dialog. In the case of internationalization, for example, depending user log-in information or profile date or IP address location, a different dialog can be presented dynamically without the need to maintain the dialog data as part of the basic application.

While the embodiment above describes providing dynamic dialogs for a downloadable toolbar, the invention is not limited to this case. Any computer software application incorporating dialogs can be modified in accordance with the methods and systems described herein to include dynamic dialogs.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed:

1. A method of providing, from a predetermined network site, a dynamic dialog for a downloadable toolbar used with a web browser, the method comprising the steps of: providing a downloadable toolbar application for defining all or part of said downloadable toolbar that provides additional functionality to said web browser operating on an end user computer, which functionality was not present in the web browser prior to the downloadable toolbar application being downloaded; providing downloadable toolbar data, said downloadable toolbar data comprising dialog display data; and in response to an event that calls for the display of a dialog: retrieving at least a portion of dialog display data from said downloadable toolbar data and not said web browser; loading said retrieved dialog display data into a dialog object; and displaying said dialog object at least partially under the control of said downloadable toolbar application.

2. The method of claim 1 further comprising: providing a first download that comprises said downloadable toolbar application, said application comprising a first set of instructions for causing actions on said end user computer operating said web browser;
providing a second download that comprises said downloadable toolbar data for defining part of the downloadable toolbar application, said downloadable toolbar data comprising a second set of instructions for causing actions on said end user computer operating said web browser.

3. The method of claim 2 wherein said second download is a button feed provided by said predetermined network site, said button feed comprising downloadable toolbar data for a plurality of buttons for said downloadable toolbar application.

4. The method of claim 3, wherein an end user has a user account with the predetermined network site for associating user defined downloadable toolbar data with said user, and further comprising the steps of: receiving at said predetermined network site a log-in request; and logging said end user on to said predetermined network site.

5. The method of claim 4, wherein said button feed comprises user defined downloadable toolbar data, said user defined downloadable toolbar data comprising user specific dialog display data.

6. The method of claim 1, wherein said downloadable toolbar data is provided together with said downloadable toolbar application.

7. The method of claim 1 further comprising the step of instantiating said dialog object.

8. The method of claim 1, wherein displaying a dialog in response to an event that calls for the display of a dialog further comprises the steps of: instantiating an instance of a web browser control for hosting in said dialog object; loading a quickly loading web page in said web browser control; and setting said dialog object as a custom user interface handler for the web browser control.

9. The method of claim 8 further comprising the step of instantiating a custom message loop.

10. The method of claim 1, wherein the dynamic dialog is implemented using an ActiveX control.

11. The method of claim 1, wherein the dynamic dialog is a function of a downloadable toolbar application that is implemented using an ActiveX control.

12. The method of claim 1, wherein said network is the Internet.

13. The method of claim 1, wherein the dialog display data comprises HTML.

14. The method of claim 1, wherein the dialog display data comprises scripting language.

15. The method of claim 1, wherein dialog display data is provided to the end user computer based on the geographical location of the end user computer.

16. The method of claim 1, further comprising the steps of: providing plugin software for said downloadable toolbar application, said plugin software providing additional functionality to said web browser, which was not present in the web browser prior to the downloadable toolbar application being downloaded; in response to a plugin event that calls for the display of a dialog, said plugin: retrieves at least a portion of dialog display data from said downloaded toolbar data and not said web browser; loads said retrieved dialog display data into a dialog object; and displays said dialog object at least partially under the control of said downloaded toolbar application.

17. The method of claim 16 wherein, the plugin is provided with said downloadable toolbar application.

18. The method of claim 1 wherein said dialog display data defines a plurality of screens, wherein an end user navigates between said plurality of screens through navigation tools displayed on said plurality of screens.

19. The method of claim 1 wherein said dialog display data defines a plurality of overlapping screen, each screen comprising a tab, wherein a user can select said tabs to view one of said plurality of screens.

20. The method of claim 1, wherein loading said retrieved dialog display data in response to an event that calls for the display of a dialog further comprises the steps of:
retrieving media for display in said dialog; and loading said retrieved media into said dialog object.

21. The method of claim 1, wherein said dialog display data defines the contents of another toolbar function.

22. The method of claim 1, wherein a language of said dialog display data is provided based on at least one language parameter.

23. A method of promoting a product or a service, the method comprising the steps of:
providing a downloadable toolbar application for defining all or part of a downloadable toolbar that provides additional functionality to a web browser operating on an end user computer, which functionality was not present in the web browser prior to the downloadable toolbar application being downloaded; providing downloadable toolbar data, said downloadable toolbar data comprising promotional material; and in response to an event related to said product or service: retrieving said promotional material from said downloadable toolbar data and not said web browser; loading said retrieved promotional material into a dialog object; and displaying said dialog object at least partially under the control of said downloadable toolbar application.

24. Computer readable media comprising computer program process code executable by a processor on a computing device, the computer program process code including instructions for generating a dynamic dialog, wherein the dynamic dialog comprises: a dialog object and dialog display data retrieved from downloadable toolbar data for a downloadable toolbar that provides additional functionality to a web browser operating on said end user computer, which functionality was not present in the web browser prior to a downloadable toolbar application being downloaded.

25. The computer program process code of claim 24 further comprising a web browser control.

26. The computer program process code of claim 25, wherein the dialog display data comprises HTML, said HTML being loaded in said web browser control.

27. The computer program process code of claim 25, wherein the dialog display data comprises scripting language, said scripting language being loaded in said web browser control.

28. The computer program process code of claim 24 further comprising the data for another toolbar function.

29. A system for providing a dynamic dialog comprising: a server coupled to a network comprising at least one end user computer; downloadable toolbar data, downloadable from said server, said downloadable toolbar data comprising dialog display data; and software, downloadable from said server, said software comprising: a downloadable toolbar application for defining all or part of a downloadable toolbar that provides additional functionality to a web browser operating on said end user computer, which functionality was not present in the web browser prior to the downloadable toolbar application being downloaded, said software, in response to an event that calls for the display of a dialog: retrieving at least a portion of dialog display data from said downloadable toolbar data and not said web browser; loading said retrieved dialog display data into a dialog object; and displaying said dialog object at least partially under the control of said downloadable toolbar application.

30. The system of claim 29, wherein displaying a dialog in response to an event that calls for the display of a dialog further comprises: instantiating an instance of a web browser control for hosting in said dialog object; loading a quickly loading web page in said web browser control; and setting said dialog object as a custom user interface handler for the web browser control.

31. The system of claim 29, wherein the dialog display data comprises HTML.

32. The system of claim 29, wherein the dialog display data comprises scripting language.

33. The system of claim 29, wherein dialog display data is provided to the end user computer based on the geographical location of the end user computer.

34. The system of claim 29, wherein a language of said dialog display data is provided based on at least one language parameter.

35. The system of claim 29, wherein said server: provides plugin software for said downloadable toolbar application, said plugin software providing additional functionality to said web browser, which was not present in the web browser prior to the downloadable toolbar application being downloaded, wherein said plugin software, in response to a plugin event that calls for the display of a dialog: retrieves at least a portion of dialog display data from said downloaded toolbar data and not said web browser; loads said retrieved dialog display data into a dialog object; and displays said dialog object at least partially under the control of said downloaded toolbar application.

36. The method of claim 35, wherein the plugin is provided together with the downloadable toolbar application.

37. Computer readable media comprising computer program process code executable by a processor on a computing device, the computer program process code including instructions comprising a method performed by software operating on a processor comprising; receiving data comprising the content of a dialog, wherein the data is received via a toolbar application operating as a browser add-on; recognizing an application event on the processor that calls for the display of a dialog; and, under control of said toolbar application, instantiating a dialog object and populating said dialog with said received data.

38. The computer program process code of claim 37 wherein receiving said data occurs after installation of said toolbar application.

39. The computer program process code of claim 37, further comprising: receiving, in a feed from a predetermined website, toolbar data for defining portions of said toolbar, wherein said dialog data is received as part of said feed.

40. The computer program process code of claim 37, wherein said dialog data comprises text.

41. The computer program process code of claim 37, wherein said dialog data comprises graphics.

42. The computer program process code of claim 37, wherein said dialog data comprises multimedia content.

43. The computer program process code of claim 37, wherein said dialog data comprises an advertisement.

44. A computer readable media comprising computer program process code executable on a computing device for implementing an add-on toolbar for a browser comprising;

a component for receiving a data feed from a predetermined website, said data feed comprising toolbar data for defining portions of said toolbar and dialog data for populating dialogs under the control of said toolbar; a component for recognizing a need to instantiate a dialog; a component for causing the instantiation of a dialog; and a component for populating said dialog with said dialog data.

* * * * *